United States Patent
Kumar et al.

(10) Patent No.: US 6,506,493 B1
(45) Date of Patent: Jan. 14, 2003

(54) METAL OXIDE PARTICLES

(75) Inventors: Sujeet Kumar, Fremont, CA (US); James T. Gardner, Cupertino, CA (US); Xiangxin Bi, San Ramon, CA (US); Nobuyuki Kambe, Menlo Park, CA (US)

(73) Assignee: NanoGram Corporation, Fremont, CA (US)

( * ) Notice: Subject to any disclaimer, the term of this patent is extended or adjusted under 35 U.S.C. 154(b) by 0 days.

(21) Appl. No.: 09/188,770

(22) Filed: Nov. 9, 1998

(51) Int. Cl.[7] ................................................. B32B 5/16
(52) U.S. Cl. ........................................ 428/402; 428/403
(58) Field of Search ................................ 428/402, 403

(56) References Cited

U.S. PATENT DOCUMENTS

| | | | |
|---|---|---|---|
| 4,376,755 A | * 3/1983 | Narayan et al. | 423/275 |
| 4,975,346 A | 12/1990 | Lecerf et al. | 429/197 |
| 4,980,251 A | 12/1990 | Thackeray et al. | 429/224 |
| 5,013,706 A | 5/1991 | Schramm et al. | 502/309 |
| 5,152,973 A | 10/1992 | Spencer | 423/419 |
| 5,348,726 A | 9/1994 | Wang et al. | 423/605 |
| 5,356,842 A | 10/1994 | Yamakawa et al. | 501/87 |
| 5,443,930 A | 8/1995 | Shoji et al. | 429/224 |
| 5,478,672 A | 12/1995 | Mitate | 429/194 |
| 5,496,664 A | 3/1996 | Sterr | 429/224 |
| 5,523,073 A | 6/1996 | Sumida et al. | 423/605 |
| 5,545,393 A | * 8/1996 | O'Young et al. | 423/605 |
| 5,549,973 A | 8/1996 | Majetich et al. | 428/403 |
| 5,604,057 A | 2/1997 | Nazri | 429/224 |
| 5,637,545 A | * 6/1997 | Lewis | 502/305 |
| 5,665,664 A | * 9/1997 | Tomioka et al. | 501/152 |
| 5,672,329 A | * 9/1997 | Okada et al. | 423/599 |
| 5,674,644 A | * 10/1997 | Nazri | 429/224 |
| 5,695,887 A | 12/1997 | Amatucci et al. | 429/48 |

(List continued on next page.)

FOREIGN PATENT DOCUMENTS

| | | |
|---|---|---|
| EP | 0 817 300 A2 | 1/1998 |
| JP | 2296732 | 12/1990 |
| JP | 3-80121 | 4/1991 |
| JP | 4-198028 | 7/1992 |
| JP | 6-275276 | 9/1994 |
| JP | 7-37593 | 2/1995 |
| JP | 7-130361 | 5/1995 |
| JP | 2513418 | 4/1996 |
| JP | 8-124557 | 5/1996 |
| JP | 8-213018 | 8/1996 |
| JP | 8-239222 | 9/1996 |
| JP | 2711624 | 10/1996 |
| JP | 9-124321 | 5/1997 |

OTHER PUBLICATIONS

"Nanocomposite Maganese Oxides for Rechargeable Lithium Batteries" by, Kim et al., Electrochemical and Solid State Letters, 1(5) 207–209 (1998), pp. 207–209. No Month.
Relationship between Chemical Bonding Nature and Electrochemical Property of $LiMn_2O_4$ Spinel Oxides with Various Particles Sizes: "Electrochemical Grafting" Concept, by, Trueil et al., J. Phys. Chem. B, 1999, 103, pp. 2100–2106. No Month.
"A $M_nO_2$–$V_2O_5$ Composit as a Positivfe Material for Secondary Lithium Batteries", by Kumagi et al., Process in Batteries & Solar, vol. 10 (1991), pp. 115–118. No Month.
"Modeling A Porous Intercalation Electrode With Two Characteristic Particle Sizes" by Darling et al., J. Electrochem. Soc., vol. 144, No. 12, Dec. 1997, pp. 4201–4208.

*Primary Examiner*—Hoa T. Le
(74) *Attorney, Agent, or Firm*—Patterson, Thuente, Skaar & Christensen, P.A.; Peter S. Dardi; David Kleinsmith

(57) ABSTRACT

Manganese oxide particles have been produced having an average diameter less than about 500 nm and a very narrow distribution of particle diameters. Methods are described for producing metal oxides by performing a reaction with an aerosol including a metal precursor. Heat treatments can be performed in an oxidizing environment to alter the properties of the manganese oxide particles.

31 Claims, 20 Drawing Sheets

U.S. PATENT DOCUMENTS

| | | |
|---|---|---|
| 5,716,737 A | 2/1998 | Hasegawa et al. ........... 429/224 |
| 5,759,720 A | 6/1998 | Amatucci .................... 428/224 |
| 5,770,018 A | 6/1998 | Saidi ...................... 204/157.15 |
| 5,807,646 A | 9/1998 | Iwata et al. .................. 429/224 |
| 5,871,863 A * | 2/1999 | Miyasaka ................... 429/218 |
| 5,874,058 A | 2/1999 | Sheargold et al. .......... 423/599 |
| 5,874,134 A * | 2/1999 | Rao et al. ................... 427/446 |
| 5,883,032 A | 3/1999 | Bogdan et al. ................ 502/66 |
| 5,952,125 A * | 9/1999 | Bi et al. ................... 429/231.2 |
| 5,958,361 A | 9/1999 | Laine et al. ................. 423/592 |
| 5,965,293 A | 10/1999 | Idota et al. ............... 429/218.1 |
| 5,985,237 A * | 11/1999 | Lu et al. ...................... 423/599 |
| 6,126,097 A * | 10/2000 | Chen et al. .................... 241/27 |
| 6,162,530 A * | 12/2000 | Xiao et al. ................ 428/292.1 |

* cited by examiner

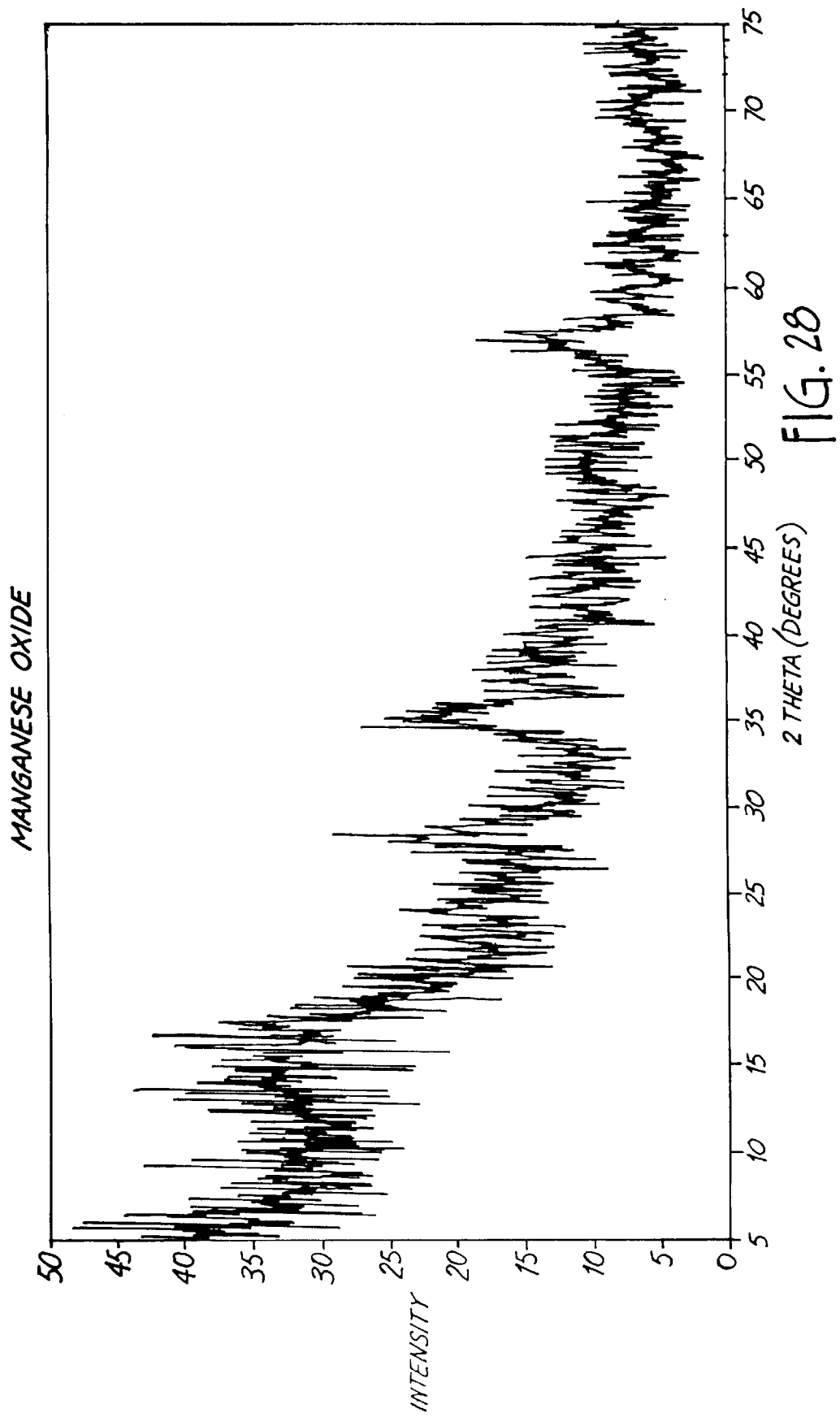

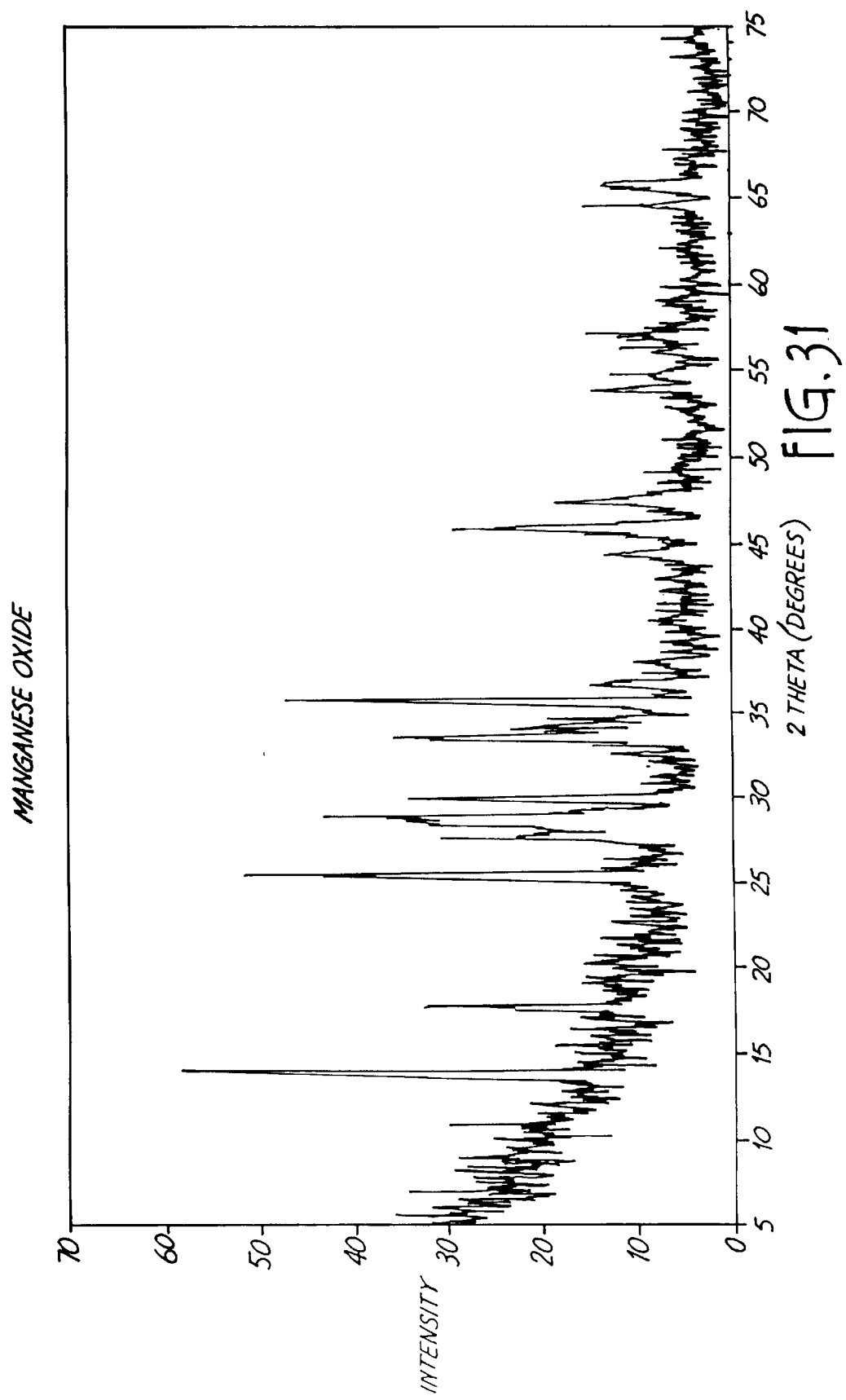

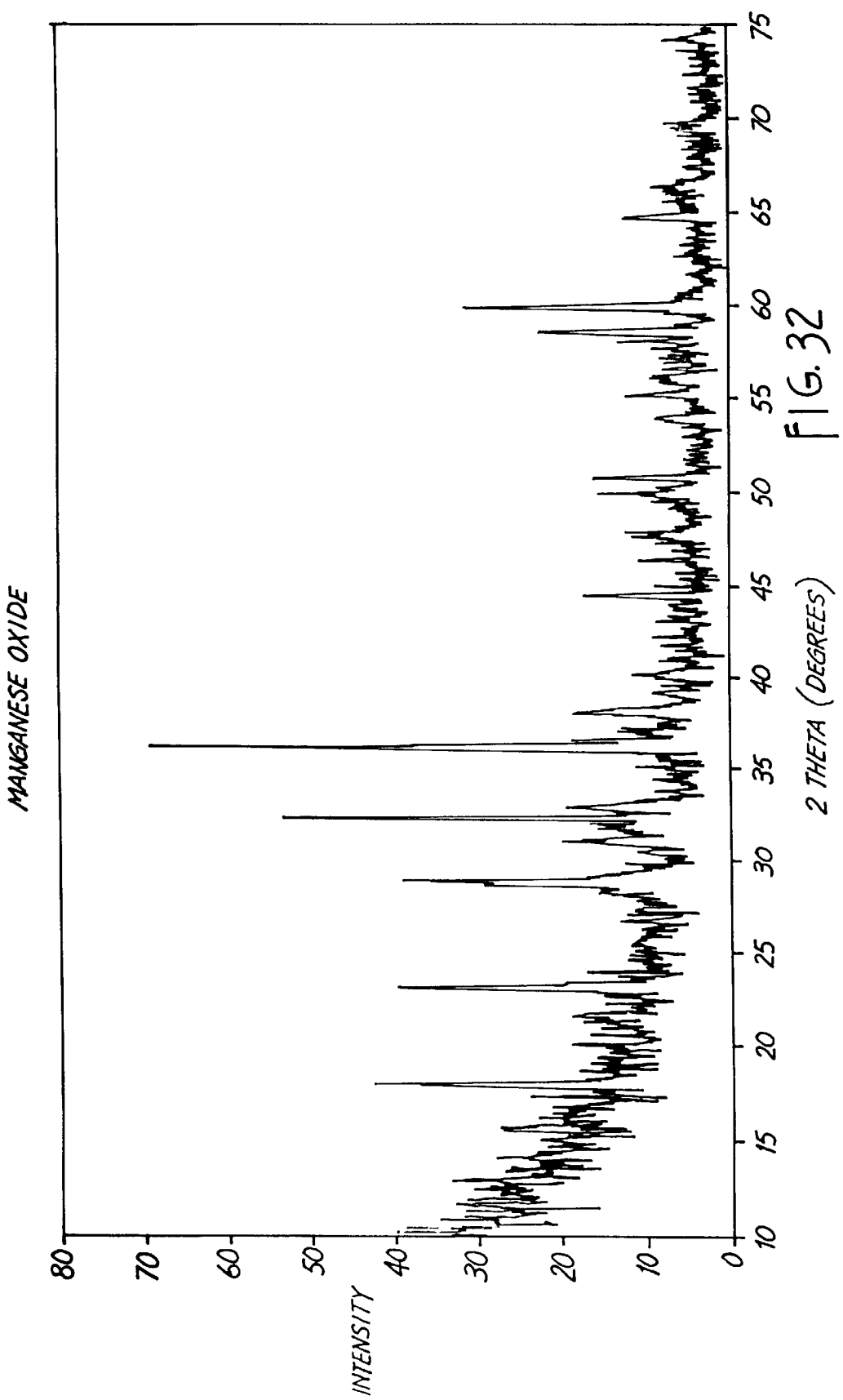

METAL OXIDE PARTICLES

FIELD OF THE INVENTION

The invention relates to metal oxide powders. More particularly, the invention relates to nanoscale metal oxide particles, such as manganese oxide particles, produced by laser pyrolysis. The invention further relates to methods for producing metal oxide powders with laser pyrolysis and aerosol precursors.

BACKGROUND OF THE INVENTION

Advances in a variety of fields have created a demand for many types of new materials. In particular, a variety of chemical powders can be used in many different processing contexts. Specifically, there is considerable interest in the application of ultrafine or nanoscale powders that are particularly advantageous for a variety of applications involving small structures or high surface area materials. This demand for ultrafine chemical powders has resulted in the development of sophisticated techniques, such as laser pyrolysis, for the production of these powders.

Manganese can exist in various oxidation states. Correspondingly, manganese oxides are known to exist with various stoichiometries. In addition, manganese oxides with a particular stoichiometry can have various crystalline lattices, or they can be amorphous. Thus, manganese oxides exhibit an extraordinarily rich phase diagram.

Manganese oxides with various stoichiometries have been noted as promising materials for use in lithium based batteries. Appropriate manganese oxides can intercalate lithium ions into their crystal structure. Because of the interest in manganese oxides, several approaches have been developed for producing manganese oxides. Other metal oxide powders are useful in the production of batteries as well as a variety of other applications.

SUMMARY OF THE INVENTION

In a first aspect, the invention pertains to a collection of particles comprising manganese oxide, the collection of particles having an average diameter less than about 500 nm, the manganese oxide having a structure selected from the group consisting of amorphous manganese oxide, crystalline MnO, crystalline $Mn_5O_8$ and crystalline $Mn_2O_3$.

In another aspect, the invention pertains to a method of producing a metal oxide powder, the method comprising reacting an aerosol within a reaction chamber to form metal oxide particles, the aerosol comprising a metal precursor and the metal oxide particles having an average diameter less than about 500 nm.

In a further aspect, the invention pertains to a method for altering the stoichiometry of a collection of manganese oxide particles, the method comprising heating manganese oxide particles in an oxidizing environment at a temperature less than about 600° C.

In another aspect, the invention pertains to a battery having a cathode comprising manganese oxide particles, said manganese oxide particles having an average diameter less than about 250 nm.

BRIEF DESCRIPTION OF THE DRAWINGS

FIG. 28 is an x-ray diffractogram of manganese oxide nanoparticles produced by laser pyrolysis with an aerosol manganese precursor according to the parameters specified in Table 2.

FIG. 31 is an x-ray diffractogram of manganese oxide nanoparticles following a heat treatment of particles produced by laser pyrolysis, sample 1 of Table 3.

FIG. 32 is an x-ray diffractogram of manganese oxide nanoparticles following a heat treatment of particles produced by laser pyrolysis, sample 2A of Table 3.

DETAILED DESCRIPTION OF THE PREFERRED EMBODIMENTS

Figure 1:
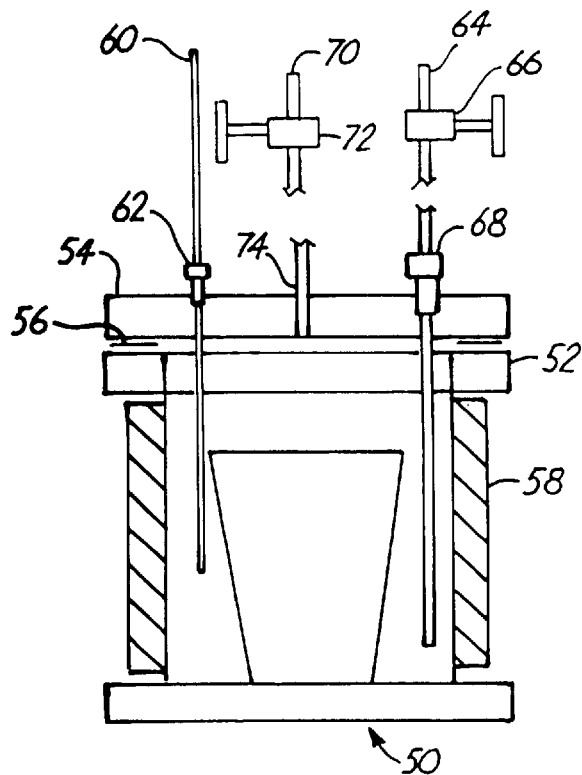
FIG. 1 is a schematic sectional view of a solid precursor delivery system taken through the center of the system.

Several approaches are described for the production of metal oxide nanoparticles. These approaches provide for the production of metal oxide particles, such as manganese oxide nanoparticles, with a wide range of properties. Aerosol based approaches are described that can make use of low cost precursors to produce nanoparticles with a high production rate. Preferred collections of metal oxide particles have an average diameter less than a micron and a very narrow distribution of particle diameters. Laser pyrolysis with or without additional processing is a versatile approach for the production of a wide range of manganese oxide materials. The aerosol based approaches described herein can be used in the production of many other metal oxide nanoparticles.

To generate the desired nanoparticles, laser pyrolysis is used either alone or in combination with additional processing. Specifically, laser pyrolysis is an excellent process for efficiently producing suitable manganese oxide particles with a narrow distribution of average particle diameters. In addition, nanoscale metal oxide particles produced by laser pyrolysis can be subjected to heating in an oxygen environment or an inert environment to alter and/or improve the properties of the particles.

A basic feature of successful application of laser pyrolysis for the production of metal oxide nanoparticles is the generation of a reactant stream containing a metal precursor compound, a radiation absorber and a secondary reactant. The secondary reactant can be an oxygen source. The reactant stream is pyrolyzed by an intense laser beam. As the reactant stream leaves the laser beam, the particles are rapidly quenched.

The reactants can be supplied in vapor form. Alternatively, one or more reactants can be supplied as an aerosol. The use of an aerosol provides for the use of a wider range of metal precursors than are suitable for vapor delivery only. Thus, less expensive precursors can be used with aerosol delivery. Also, aerosol delivery can be used for high production rates. Suitable control of the reaction conditions with the aerosol results in nanoscale particles with a narrow particle size distribution.

As noted above, various forms of manganese oxide can intercalate lithium atoms and/or ions. The manganese oxide nanoparticles can be incorporated into a cathode film with a binder such as a polymer. The film preferably incorporates additional electrically conductive particles held by the binder along with the manganese oxide particles. The cathode film can be used in a lithium battery or a lithium ion battery. The electrolyte for lithium and lithium ion batteries comprises lithium ions.

A. Particle Production

Laser pyrolysis has been discovered to be a valuable tool for the production of nanoscale metal oxide particles, in particular manganese oxide particles. In addition, the particles produced by laser pyrolysis are a convenient material for further processing to expand the pathways for the production of desirable metal oxide particles. Thus, using laser pyrolysis alone or in combination with additional processes, a wide variety of metal oxide particles can be produced.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce manganese oxide particles in two particular apparatuses are described below in the Examples. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different forms of a product compound have a tendency to form different size particles from other phases under relatively similar conditions. Laser power also influences particle size with increased laser power favoring larger particle formation for lower melting materials and smaller particle formation for higher melting materials.

Laser pyrolysis has been performed generally with gas phase reactants. The use of exclusively gas phase reactants is somewhat limiting with respect to the types of precursor compounds that can be used. Thus, techniques have been developed to introduce aerosols containing reactant precursors into laser pyrolysis chambers. The aerosol atomizers can be broadly classified as ultrasonic atomizers, which use an ultrasonic transducer to form the aerosol, or as mechanical atomizers, which use energy from one or more flowing fluids (liquids, gases, or supercritical fluids) themselves to form the aerosol.

Improved aerosol delivery apparatuses for reactant systems are described further in commonly assigned and simultaneously filed U.S. patent application Ser. No. 09/188,670, now U.S. Pat. No. 6,193,936, entitled "Reactant Delivery Apparatuses," incorporated herein by reference. The formation of composite metal oxide particles using multiple metal precursors with an aerosol delivery apparatus is described in commonly assigned and simultaneously filed U.S. patent application Ser. No. 09/188,768 to Kumar et al., entitled "Composite Metal Oxide Particles," incorporated herein by reference.

Using aerosol delivery apparatuses, solid precursor compounds can be delivered by dissolving the compounds in a solvent. Alternatively, powdered precursor compounds can be dispersed in a liquid\solvent for aerosol delivery. Liquid precursor compounds can be delivered as an aerosol from a neat liquid, a multiple fluid (liquid/gas) dispersion or a liquid solution, if desired. Aerosol reactants can be used to obtain a significant reactant throughput. The solvent, if any, can be selected to achieve desired properties of the solution. Suitable solvents include water, methanol, ethanol, isopropyl alcohol and other organic solvents. The solvent should have a desired level of purity such that the resulting particles have a desired purity level.

If the aerosol precursors are formed with a solvent present, the solvent is rapidly evaporated by the laser beam in the reaction chamber such that a gas phase reaction can take place. Thus, the fundamental features of the laser pyrolysis reaction is unchanged. However, the reaction conditions are affected by the presence of the aerosol. Below, examples are described for the production of manganese oxide nanoparticles using gaseous reaction precursors and aerosol precursors using two different laser pyrolysis reaction chambers. The parameters associated with aerosol reactant delivery can be explored based on the description below.

A number of suitable solid, manganese precursor compounds can be delivered as an aerosol from solution. For example, manganese chloride ($MnCl_2$) and hydrated manganese chloride ($MnCl_2 \cdot H_2O$) are soluble in water and alcohols, and manganese nitrate ($Mn(NO_3)_2$) is soluble in water and certain organic solvents. Similarly, suitable vanadium precursors for aerosol production include, for example, $VOCl_2$, which is soluble in absolute alcohol.

The compounds are dissolved in a solution preferably with a concentration greater than about 0.5 molar. Generally, the greater the concentration of precursor in the solution the greater the throughput of reactant through the reaction chamber. As the concentration increases, however, the solution can become more viscous such that the aerosol has droplets with larger sizes than desired. Thus, selection of solution concentration can involve a balance of factors in the selection of a preferred solution concentration.

Appropriate manganese precursor compounds for gaseous delivery generally include manganese compounds with reasonable vapor pressures, i.e., vapor pressures sufficient to get desired amounts of precursor vapor in the reactant stream. The vessel holding liquid or solid precursor compounds can be heated to increase the vapor pressure of the manganese precursor, if desired. Suitable solid, manganese precursors with sufficient vapor pressure of gaseous delivery include, for example, manganese carbonyl ($Mn_2(CO)_{10}$). A suitable container for heating and delivering a solid precursor to a laser pyrolysis apparatus is shown in FIG. 1.

Referring to FIG. 1, the solid precursor delivery system 50 includes a container 52 and a lid 54. A gasket 56 is located between container 52 and lid 54. In one preferred embodiment, container 52 and lid 54 are made from stainless steel, and gasket 56 is made from copper. In this embodiment, lid 54 and gasket 56 are bolted to container 52. Other inert materials, such as Pyrex®, suitable for the temperatures and pressures applied to the solid precursor system can be used. Container 52 is surrounded with a band heater 58, which is used to set the temperature of the delivery system 50 at desired values. Suitable band heaters are available from Omega Engineering Inc. Stamford, Conn. The temperature of the band heater can be adjusted to yield a desired vapor pressure of the precursor compound. Additional portions of the precursor delivery system can be heated to maintain the precursor in a vapor state after it has left container 52.

Preferably, a thermocouple 60 is inserted into container 52 through lid 54. Thermocouple 60 can be inserted by way of a Swagelok® fitting 62 or other suitable connection. Tubing 64 provides a input flow of a carrier gas into container 52. Tubing 64 preferably includes a shut off valve 66 and can be inserted through lid 54 by way of a Swagelok® fitting 68 or other suitable connection. Output tube 70 also preferably includes a shut off valve 72. Output tube 70 preferably enters into container 52 through lid 54 at a sealed connection 74. Tubes 64 and 70 can be made of any suitable inert material such as stainless steel. A solid precursor can be placed directly within container 52 or it can be placed within a smaller, open container within container 52.

Preferred secondary reactants serving as oxygen source include, for example, $O_2$, $CO$, $CO_2$, $O_3$ and mixtures thereof. The secondary reactant compound should not react significantly with the manganese precursor prior to entering the reaction zone since this generally would result in the formation of large particles.

Laser pyrolysis can be performed with a variety of optical laser frequencies. Preferred lasers operate in the infrared portion of the electromagnetic spectrum. $CO_2$ lasers are particularly preferred sources of laser light. Infrared absorbers for inclusion in the molecular stream include, for example, $C_2H_4$, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the radiation beam increases the temperature at a tremendous rate, many times the rate that energy generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$.

An appropriate laser pyrolysis apparatus generally includes a reaction chamber isolated from the ambient environment. A reactant inlet connected to a reactant supply system produces a reactant stream through the reaction chamber. A laser beam path intersects the reactant stream at a reaction zone. The reactant stream continues after the reaction zone to an outlet, where the reactant stream exits the reaction chamber and passes into a collection system. Generally, the laser is located external to the reaction chamber, and the laser beam enters the reaction chamber through an appropriate window.

Two laser pyrolysis reaction chambers are described further below. These laser pyrolysis reaction chambers can be configured for delivery of gas phase reactants and/or aerosol reactants. As noted above the particles/powders can be further treated by heating. After the description of the laser pyrolysis apparatuses, the heating process is described further.

1. First Laser Pyrolysis Reaction Chamber

Figure 2:
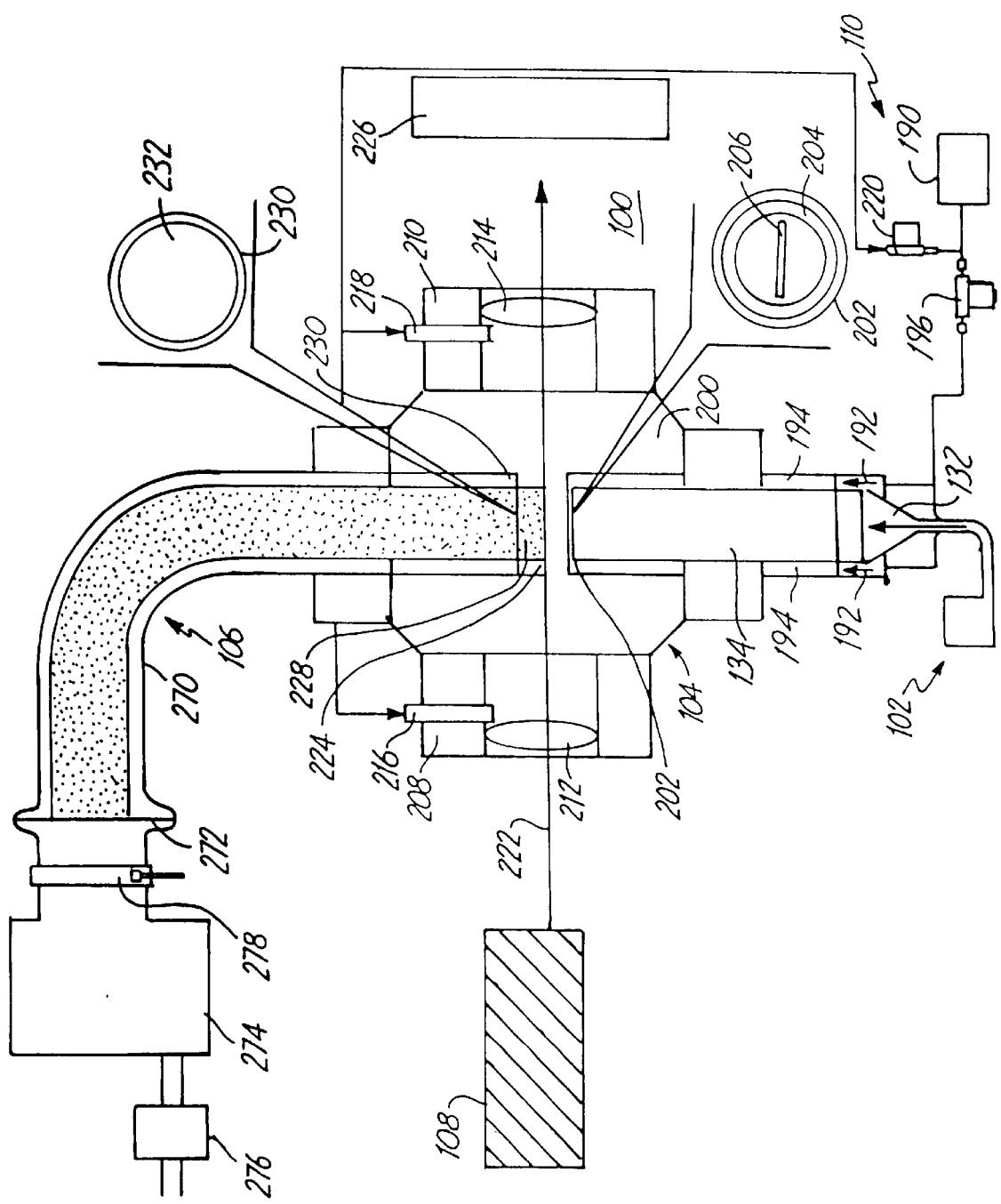
FIG. 2 is a schematic, sectional view of an embodiment of a laser pyrolysis apparatus, where the cross section is taken through the middle of the laser radiation path. The upper insert is a bottom view of the collection nozzle, and the lower insert is a top view of the injection nozzle.

Referring to FIG. 2, a particular embodiment 100 of a laser pyrolysis apparatus involves a reactant supply system 102, reaction chamber 104, collection system 106, laser 108 and shielding gas delivery system 110. Two alternative reaction supply systems can be used with the apparatus of FIG. 2. The first reaction supply system is used to deliver exclusively gaseous reactants. The second reactant supply system is used to deliver one or more reactants as an aerosol.

Figure 3:
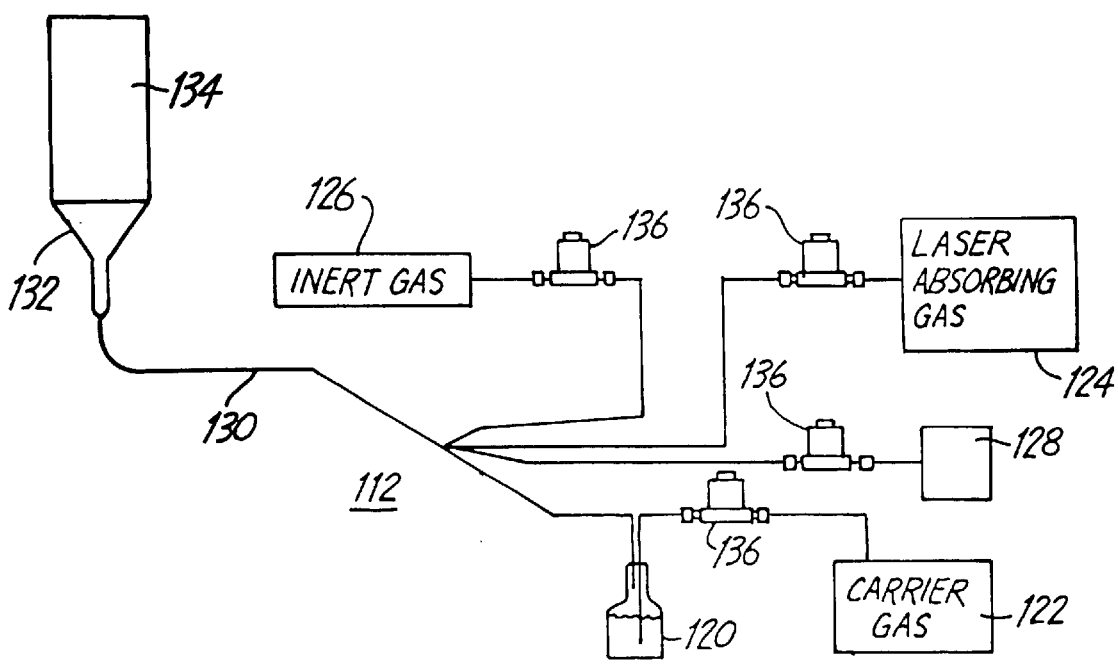
FIG. 3 is a schematic, side view of a reactant delivery apparatus for the delivery of vapor reactants to the laser pyrolysis apparatus of FIG. 2.

Referring to FIG. 3, a first embodiment of reactant supply system 112 includes a source 120 of precursor compound. For liquid or solid precursors, a carrier gas from carrier gas source 122 can be introduced into precursor source 120 to facilitate delivery of the precursor as a vapor. Precursor source 120 can be a solid precursor delivery system 50, as shown in FIG. 1. The carrier gas from source 122 preferably is either an infrared absorber or an inert gas and is preferably bubbled through a liquid precursor compound or delivered into a solid precursor delivery system. Inert gas used as a carrier gas can moderate the reaction conditions. The quantity of precursor vapor in the reaction zone is roughly proportional to the flow rate of the carrier gas.

Alternatively, carrier gas can be supplied directly from infrared absorber source 124 or inert gas source 126, as appropriate. The secondary reactant is supplied from reactant source 128, which can be a gas cylinder or other suitable container. The gases from the precursor source 120 are mixed with gases from reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104.

The combined gas in tube 130 passes through a duct 132 into rectangular channel 134, which forms part of an injection nozzle for directing reactants into the reaction chamber. Portions of reactant supply system 112 can be heated to inhibit the deposition of precursor compound on the walls of the delivery system.

Figure 4:
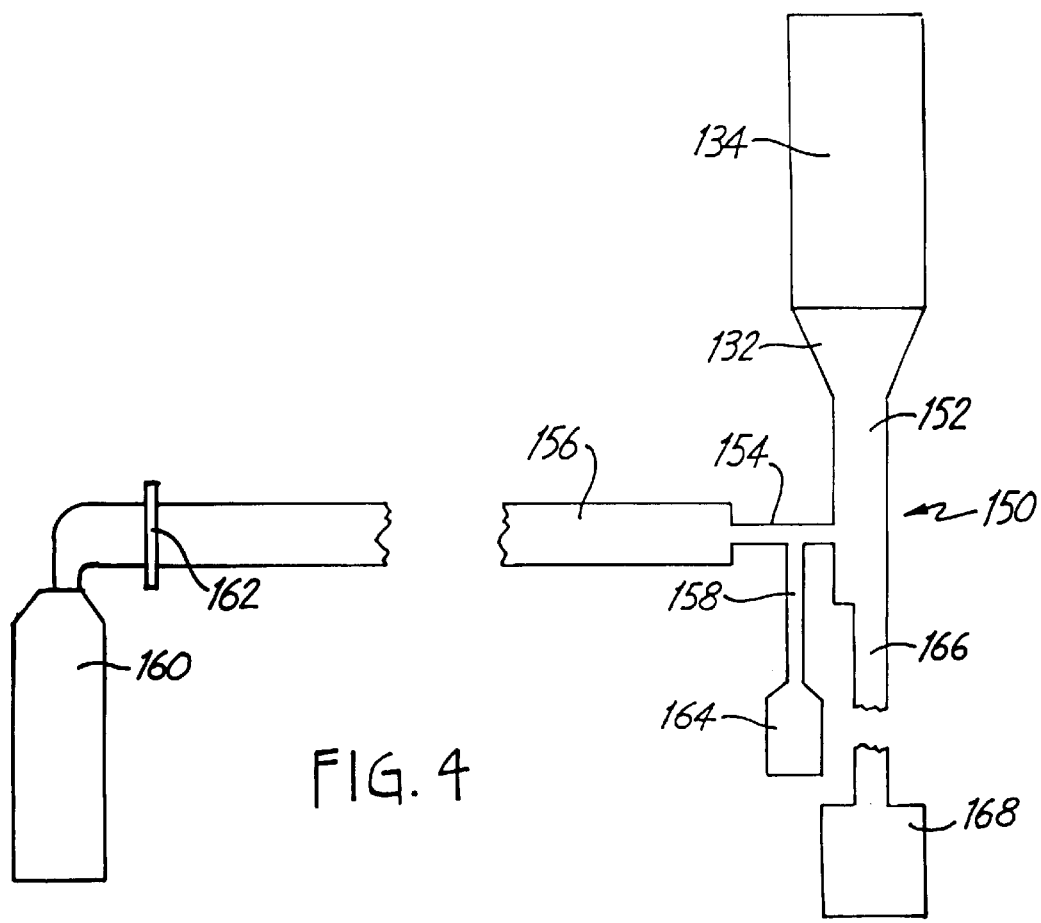
FIG. 4 is schematic, side view of a reactant delivery apparatus for the delivery of an aerosol reactant to the laser pyrolysis apparatus of FIG. 2.
Figure 22:
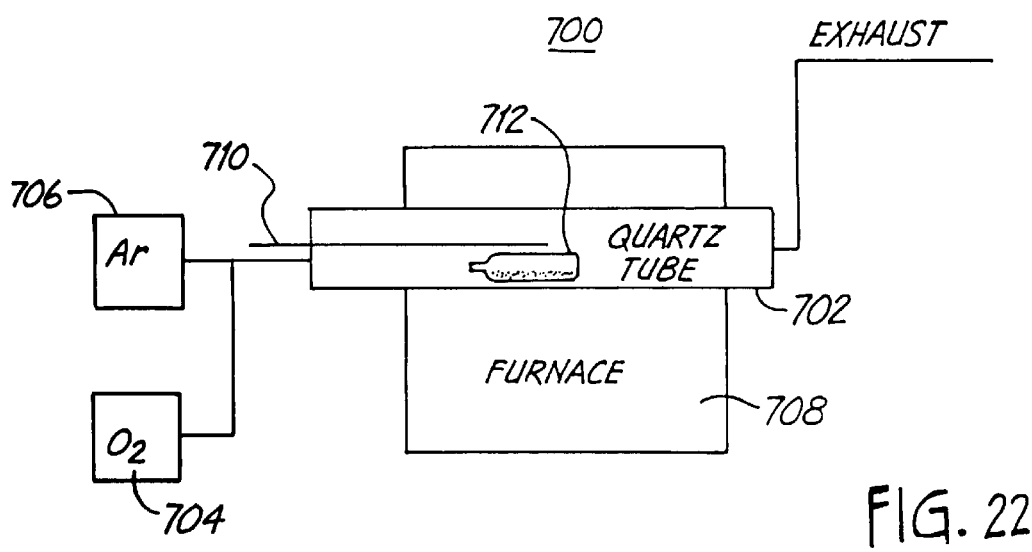
FIG. 22 is a schematic, sectional view of an oven for heating nanoparticles, in which the section is taken through the center of the quartz tube.

Referring to FIG. 4, a second embodiment of the reactant supply system 150 is used to supply an aerosol to duct 132. Duct 132 connects with rectangular channel 134, which forms part of an injection nozzle for directing reactants into the reaction chamber. Reactant supply system 150 includes a delivery tube 152 that is connected to duct 132. Venturi tube 154 connects to delivery tube 152 as a source of the aerosol. Venturi tube 154 is connected to gas supply tube 156 and liquid supply tube 158.

Gas supply tube 156 is connected to gas source 160. Gas source 160 can include a plurality of gas containers that are connected to deliver a selected gas or gas mixture to gas supply tube 156. The flow of gas from gas source 160 to gas supply tube 156 is controlled by one or more valves 162. Liquid supply tube 158 is connected to liquid supply 164. Delivery tube 152 also connects with drain 166 that flows to reservoir 168.

In operation, gas flow through venturi tube 154 creates suction that draws liquid into venturi tube 154 from liquid supply tube 158. The gas-liquid mixture in venturi tube 154 forms an aerosol when venturi tube 154 opens into delivery tube 152. The aerosol is drawn up into duct 132 by pressure differentials within the system. Any aerosol that condenses within delivery tube 152 is collected in reservoir 168, which is part of the closed system.

Referring to FIG. 2, shielding gas delivery system 110 includes inert gas source 190 connected to an inert gas duct 192. Inert gas duct 192 flows into annular channel 194. A mass flow controller 196 regulates the flow of inert gas into inert gas duct 192. If reactant delivery system 112 is used, inert gas source 126 can also function as the inert gas source for duct 192, if desired.

The reaction chamber 104 includes a main chamber 200. Reactant supply system 102 connects to the main chamber 200 at injection nozzle 202. Reaction chamber 104 can be heated to keep the precursor compound in the vapor state. In particular, the entire reaction chamber 104 preferably is heated to about 120° C. when a solid precursor is used. Similarly, the argon shielding gas preferably is heated to about 150° C. when a solid precursor is used. The chamber can be examined for condensation to ensure that precursor is not deposited on the chamber.

The end of injection nozzle 202 has an annular opening 204 for the passage of inert shielding gas, and a reactant inlet 206 for the passage of reactants to form a reactant stream in the reaction chamber. Reactant inlet 206 preferably is a slit, as shown in FIG. 2. Annular opening 204 has, for example, a diameter of about 1.5 inches and a width along the radial direction from about ⅛ in to about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants and/or products. Window 212, 214 are displaced, for example, about 3 cm from the edge of the main chamber 200.

Windows 212, 214 are sealed with a rubber O-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J.

Reactants passing through reactant inlet 206 in injection nozzle 202 initiate a reactant stream. The reactant stream passes through reaction zone 224, where reaction involving the manganese precursor compound takes place. Heating of the gases in reaction zone 224 is extremely rapid, roughly on the order of $10^5$ degree C/sec depending on the specific conditions. The reaction is rapidly quenched upon leaving reaction zone 224, and particles 228 are formed in the reactant stream. The nonequilibrium nature of the process allows for the production of nanoparticles with a highly uniform size distribution and structural homogeneity.

The path of the reactant stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The preferred chamber pressure for the production of the desired oxides generally ranges from about 80 Torr to about 500 Torr.

Reaction chamber 104 has two additional tubular sections not shown. One of the additional tubular sections projects into the plane of the sectional view in FIG. 2, and the second additional tubular section projects out of the plane of the sectional view in FIG. 2. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 preferably includes a curved channel 270 leading from collection nozzle 230. Because of the small size of the particles, the product particles follow the flow of the gas around curves. Collection system 106 includes a filter 272 within the gas flow to collect the product particles. Due to curved section 270, the filter is not supported directly above the chamber. A variety of materials such as Teflon, glass fibers and the like can be used for the filter as long as the material is inert and has a fine enough mesh to trap the particles. Preferred materials for the filter include, for example, a glass fiber filter from ACE Glass Inc., Vineland, N.J. and cylindrical polypropylene filters from Cole-Parmer Instrument Co., Vernon Hills, Ill.

Pump 274 is used to maintain collection system 106 at a selected pressure. A variety of different pumps can be used. Appropriate pumps for use as pump 274 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 276 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 274 and filter 272. As the chamber pressure increases due to the accumulation of particles on filter 272, the manual valve or the throttle valve can be adjusted to maintain the pumping rate and the corresponding chamber pressure.

The reaction can be continued until sufficient particles are collected on filter 272 such that the pump can no longer maintain the desired pressure in the reaction chamber 104 against the resistance through filter 272. When the pressure in reaction chamber 104 can no longer be maintained at the desired value, the reaction is stopped, and filter 272 is removed. With this embodiment, about 1–300 grams of particles can be collected in a single run before the chamber pressure can no longer be maintained. A single run generally can last up to about 10 hours depending on the type of particle being produced and the type of filter being used.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the top of the reaction chamber, and the product particles are collected from the bottom of the chamber. In this configuration, the collection system may not include a curved section so that the collection filter is mounted directly below the reaction chamber.

2. Second Laser Pyrolysis Reaction Chamber

An alternative design of a laser pyrolysis apparatus has been described in copending and commonly assigned U.S. patent application Ser. No. 08/808,850 now U.S. Pat. No. 5,958,348, entitled "Efficient Production of Particles by Chemical Reaction," incorporated herein by reference. This alternative design is intended to facilitate production of commercial quantities of particles by laser pyrolysis. The reaction chamber is elongated along the laser beam in a dimension perpendicular to the reactant stream to provide for an increase in the throughput of reactants and products. The original design of the apparatus was based on the introduction of purely gaseous reactants. A particular embodiment for the introduction of an aerosol into the apparatus is described below. Additional embodiments for the introduction of an aerosol into an elongated reaction chamber is described in commonly assigned and simultaneously filed U.S. patent application Ser. No. 09/188,670 to Gardner et al. now U.S. Pat. No. 6,193,936, entitled "Reactant Delivery Apparatuses," incorporated herein by reference.

In general, the alternative pyrolysis apparatus includes a reaction chamber designed to reduce contamination of the chamber walls, to increase the production capacity and to make efficient use of resources. To accomplish these objectives, an elongated reaction chamber is used that provides for an increased throughput of reactants and products without a corresponding increase in the dead volume of the chamber. The dead volume of the chamber can become contaminated with unreacted compounds and/or reaction products.

Figure 5:
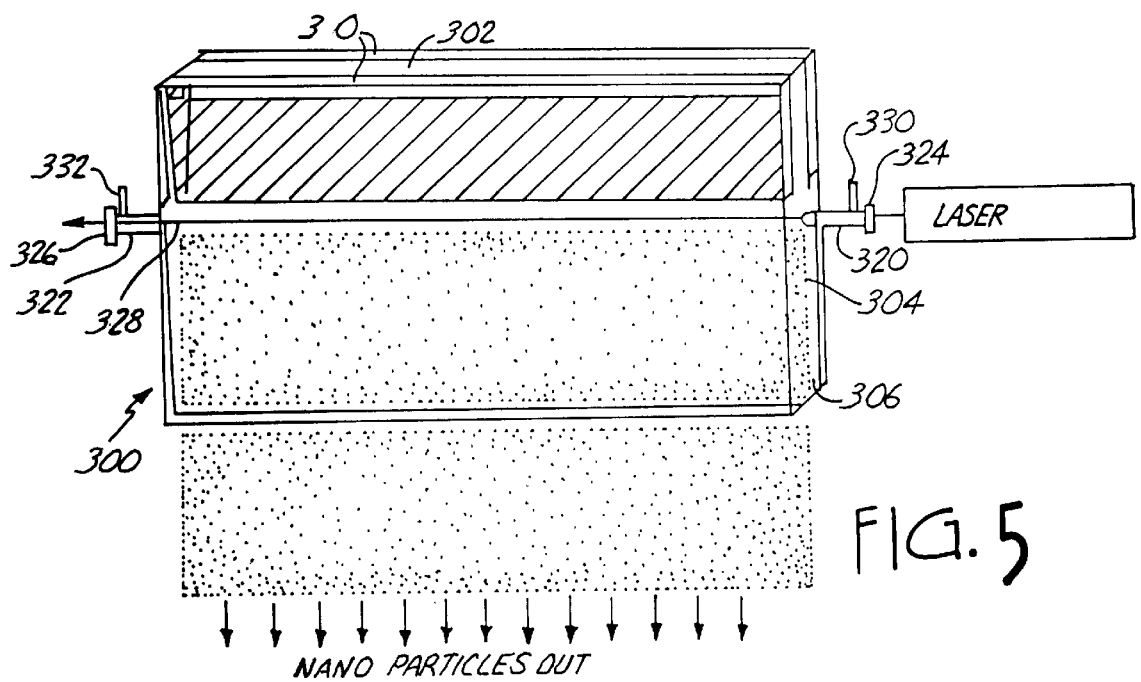
FIG. 5 is a schematic, perspective view of an elongated reaction chamber for the performance of laser pyrolysis, where components of the reaction chamber are shown as transparent to reveal internal structure.

The design of the improved reaction chamber 300 is shown schematically in FIG. 5. A reactant inlet 302 enters the main chamber 304. Reactant inlet 302 conforms generally to the shape of main chamber 304. Main chamber 304 includes an outlet 306 along the reactant\product stream for removal of particulate products, any unreacted gases and inert gases. Shielding gas inlets 310 are located on both sides of reactant inlet 302. Shielding gas inlets are used to form a blanket of inert gases on the sides of the reactant stream to inhibit contact between the chamber walls and the reactants and products.

Tubular sections 320, 322 extend from the main chamber 304. Tubular sections 320, 322 hold windows 324, 326 to define a laser beam path 328 through the reaction chamber 300. Tubular sections 320, 322 can include inert gas inlets 330, 332 for the introduction of inert gas into tubular sections 320, 322.

Figure 6:
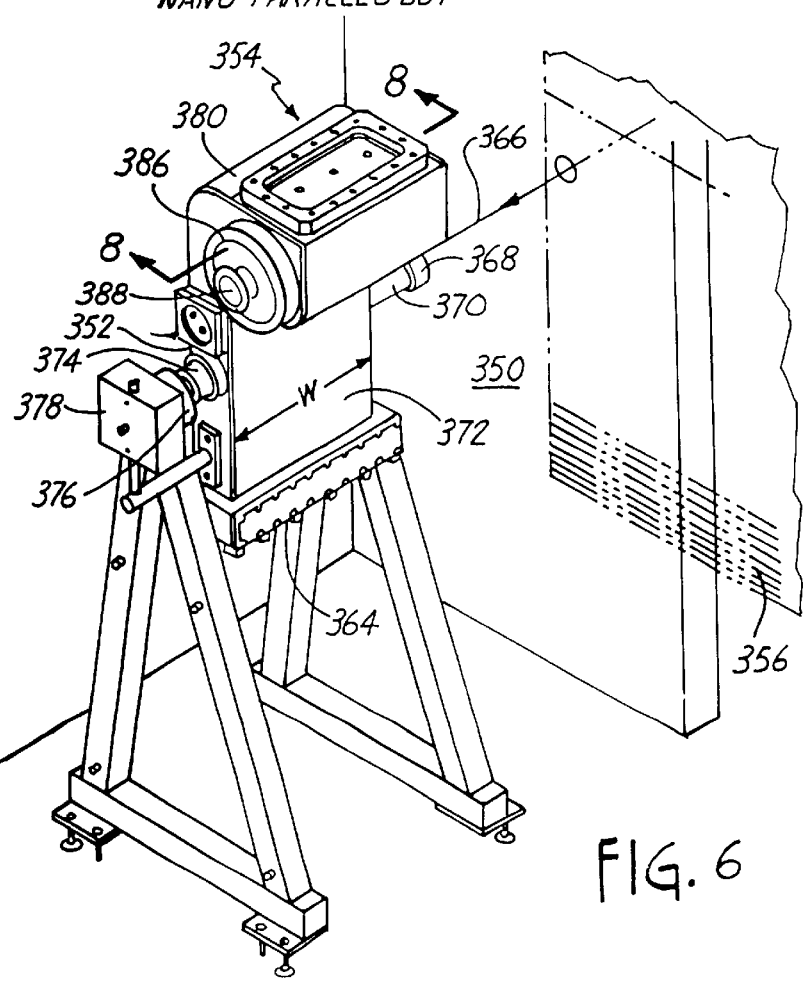
FIG. 6 is a perspective view of an embodiment of an elongated reaction chamber for performing laser pyrolysis.
Figure 7:
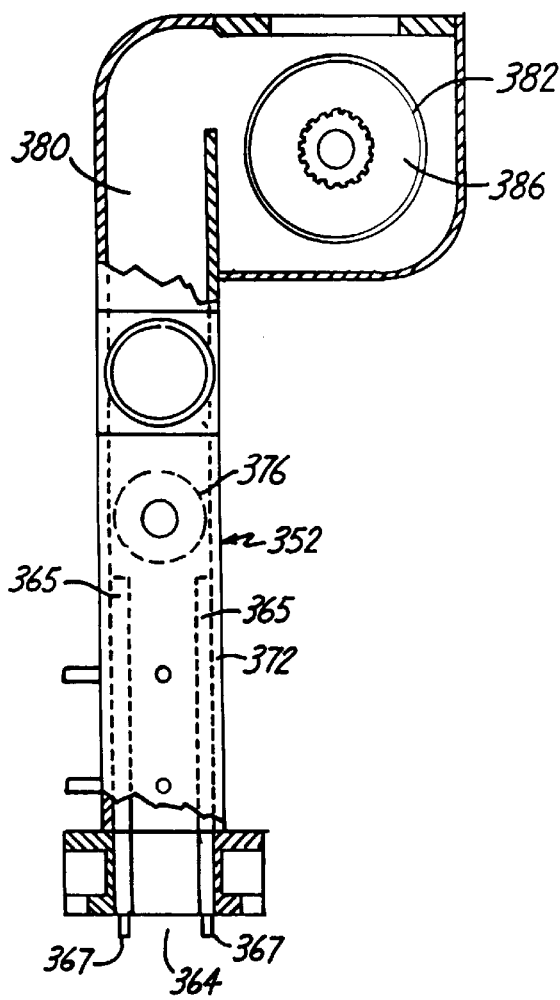
FIG. 7 is a cut away, side view of the reaction chamber of FIG. 6.
Figure 8:
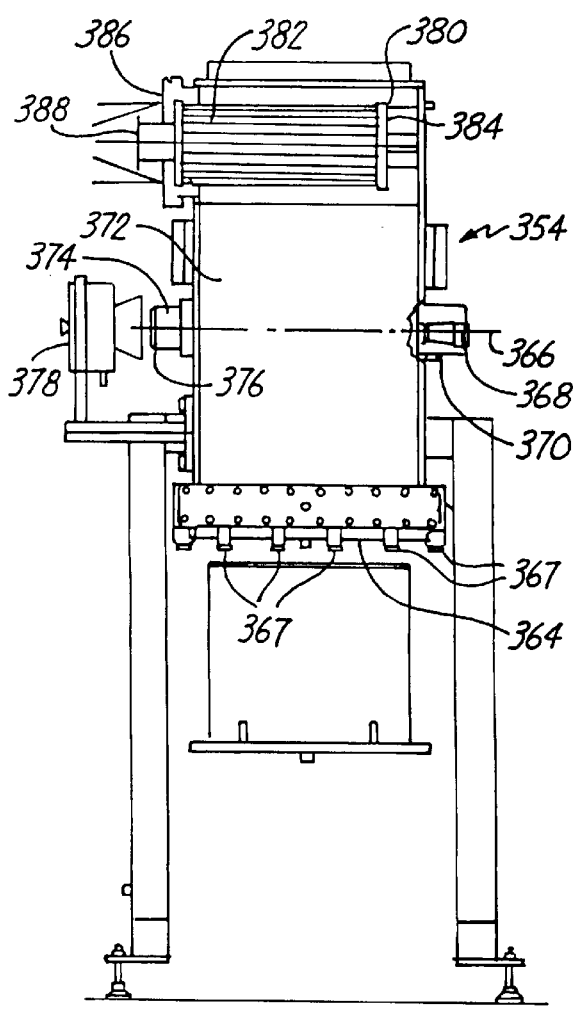
FIG. 8 is a partially sectional, side view of the reaction chamber of FIG. 6, taken along line 8—8 of FIG. 6.

Referring to FIGS. 6–8, a specific embodiment of a laser pyrolysis reaction system 350 with aerosol reactant delivery includes reaction chamber 352, a particle collection system 354, laser 356 and a reactant delivery system 358 (described below). Reaction chamber 352 includes reactant inlet 364 at the bottom of reaction chamber 352 where reactant delivery system 358 connects with reaction chamber 352. In this embodiment, the reactants are delivered from the bottom of the reaction chamber while the products are collected from the top of the reaction chamber. The configuration can be reversed with the reactants supplied from the top and product collected from the bottom, if desired.

Shielding gas conduits 365 are located on the front and back of reactant inlet 364. Inert gas is delivered to shielding gas conduits 365 through ports 367. The shielding gas conduits direct shielding gas along the walls of reaction chamber 352 to inhibit association of reactant gases or products with the walls.

Reaction chamber 352 is elongated along one dimension denoted in FIG. 6 by "w". A laser beam path 366 enters the reaction chamber through a window 368 displaced along a tube 370 from the main chamber 372 and traverses the elongated direction of reaction chamber 352. The laser beam passes through tube 374 and exits window 376. In one preferred embodiment, tubes 370 and 374 displace windows 368 and 376 about 11 inches from the main chamber. The laser beam terminates at beam dump 378. In operation, the laser beam intersects a reactant stream generated through reactant inlet 364.

The top of main chamber 372 opens into particle collection system 354. Particle collection system 354 includes outlet duct 380 connected to the top of main chamber 372 to receive the flow from main chamber 372. Outlet duct 380 carries the product particles out of the plane of the reactant stream to a cylindrical filter 382. Filter 382 has a cap 384 on one end. The other end of filter 382 is fastened to disc 386. Vent 388 is secured to the center of disc 386 to provide access to the center of filter 382. Vent 388 is attached by way of ducts to a pump. Thus, product particles are trapped on filter 382 by the flow from the reaction chamber 352 to the pump. Suitable pumps were described above. Suitable pumps include, for example, an air cleaner filter for a Saab 9000 automobile (Purilator part A44-67), which is wax impregnated paper with Plasticol or polyurethane end caps.

Figure 9:
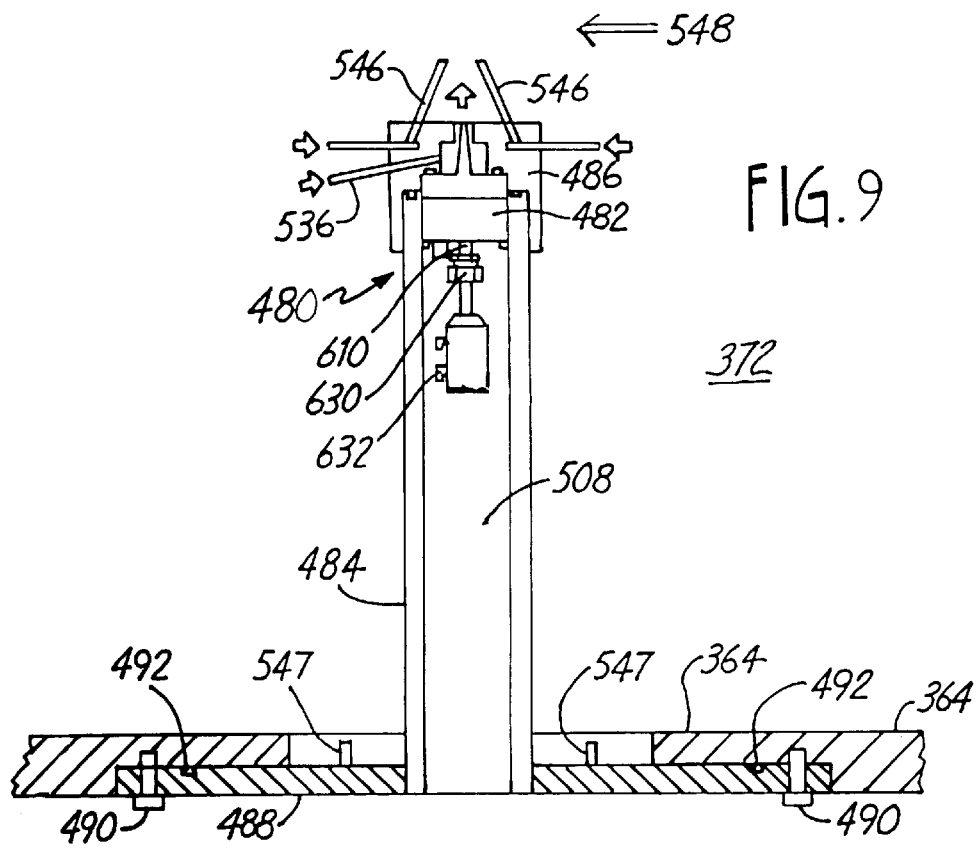
FIG. 9 is a sectional, front view of a reactant delivery apparatus for the delivery of an aerosol reactant into the reaction chamber of FIG. 6, where the cross section is taken through the center of the reactant delivery apparatus.

Referring to FIG. 9, an aerosol delivery apparatus 480 includes an aerosol generator 482, which is supported by mount 484 and a cap 486. Aerosol delivery apparatus 480 is secured to reactant inlet 364 of reaction chamber 352 to extend within main chamber 372, shown in FIGS. 6–8. Mount 484 is connected to a base plate 488. Base plate 488 is fastened to reactant inlet 364 with bolts 490. An O-ring or the like, suitably shaped, can be placed within hollow 492 to form a seal between base plate 488 and reactant inlet 364.

Figure 10:
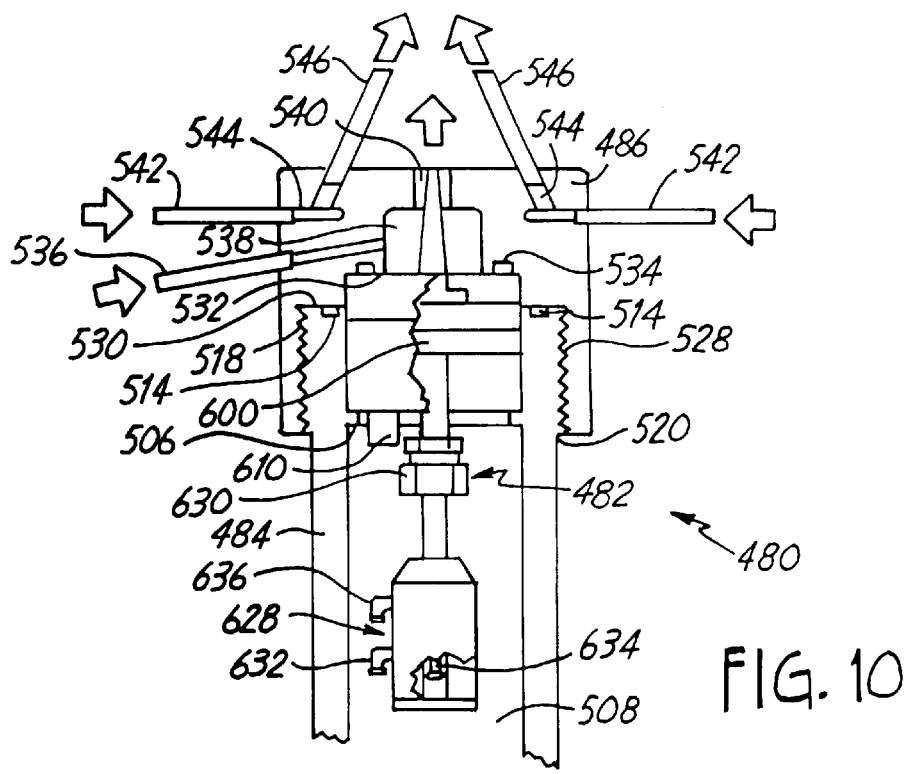
FIG. 10 is a fragmentary, sectional front view of the top portion of the reactant delivery apparatus of FIG. 9.
Figure 11:
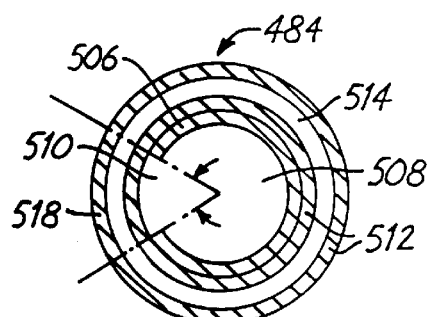
FIG. 11 is a top view of the mount of the reactant delivery apparatus of FIG. 9.

Referring to FIGS. 10 and 11, mount 484 has a generally cylindrical shape. Mount 484 includes a lip 506 extending within cylindrical cavity 508. Lip 506 helps support aerosol generator 482. In this embodiment, lip 506 includes a notch 510, which allows a portion of aerosol generator 482 to extend past lip 506. Top surface 512 of mount 484 includes a hollow 514 for holding an O-ring or the like to form a seal with cap 486 or a spacer, described below. Mount 484 further includes threads 518 on the outer surface 520.

Figure 13:
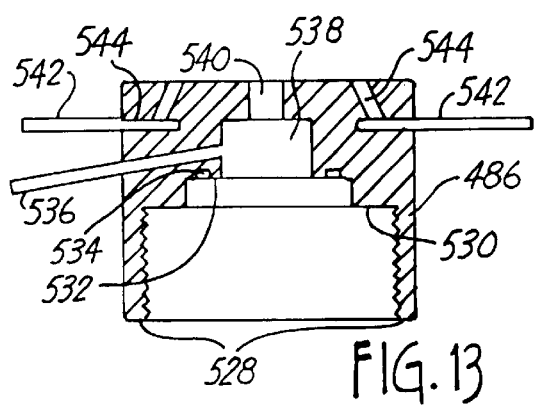
FIG. 13 is a sectional view of the cap of FIG. 12 taken along line 13—13.
Figure 12:
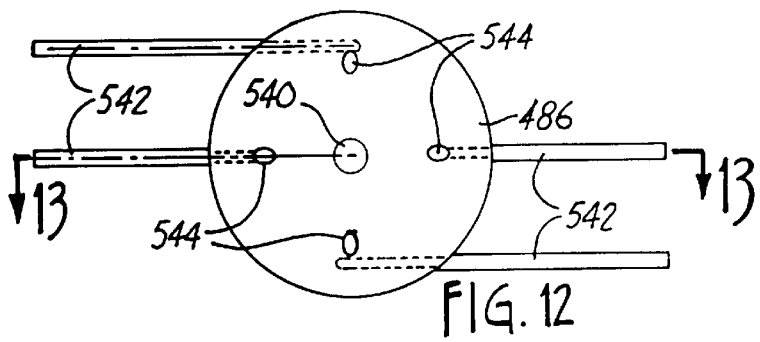
FIG. 12 is a top view of a cap of the aerosol delivery apparatus of FIG. 9.

Referring to FIGS. 10, 12 and 13, cap 486 attaches over the top of mount 484. Cap 486 includes threads 528 that are mated with threads 518 on mount 484. Flange 530 can be used to form a seal with an O-ring or the like. Surface 532 includes hollow 534. Hollow 534 can hold an O-ring or the like to form a seal with aerosol generator 482 or a shim, described further below.

Tube 536 is in fluid communication with cavity 538. Tube 536 provides for gas flow into cavity 538. Cavity 538 vents through port 540. Tubes 542 provide for fluid flow through channels 544 into projecting tubes 546. In this embodiment, four projecting tubes 546 project toward the flow stream coming from aerosol generator 482 and port 540. Four projecting tubes 546 are symmetrically distributed around port 540. More or less than four projecting tubes 546 can be used, if desired. Gas can be supplied to tubes 536 and 542 through one or more ports 547 through base plate 488 by way of stainless steel tubing or the like.

The use of projecting tubes 546 are particularly useful to mix reactants further within the reaction chamber away from aerosol generator 482. Such mixing further in the reaction chamber can be useful particularly if the reaction is highly exothermic. Using projecting tubes 546, gases such as reactant gases and/or radiation absorbing gases can be mixed within reaction chamber 352 with reactants from aerosol generator 482 and/or port 540. Laser beam path 548 intersects the reaction stream just above projecting tubes 546.

The position of aerosol generator 482 relative to port 540 can affect the properties of the resulting reactant stream and thereby the properties of the reaction product. With an ultrasonic aerosol generator, the tip of the aerosol generator preferably is located between positions just slightly the cap surface to just slightly above the cap surface.

Figure 14:
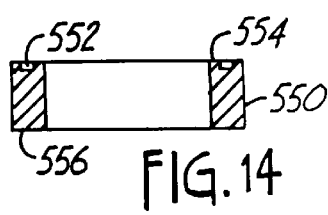
FIG. 14 is a sectional side view of a spacer used in the aerosol delivery apparatus of FIG. 9, where the cross section is taken through the center of the spacer.
Figure 15:
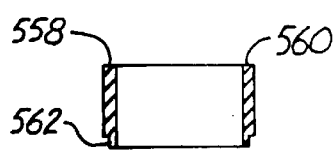
FIG. 15 is a sectional side view of a shim used in the aerosol delivery apparatus of FIG. 9, where the cross section is taken through the center of the shim.

Spacer 550, shown in FIG. 14, can be placed between cap 486 and mount 484 to change the position of aerosol generator 482 relative to port 540. Spacer 550 is a cylindrical piece with a hollow 552 along top surface 554 for holding an O-ring or the like. Top surface 554 seals against flange 530 of cap 486. Lower surface 556 of spacer 550 seals against top surface 512 of mount 484. A shim 558 as shown in FIG. 15 is correspondingly placed between cap 486 and aerosol generator 482. Top surface 560 of shim 558 engages the O-ring in hollow 534. Flange 562 engages the aerosol generator 482.

Figure 16:
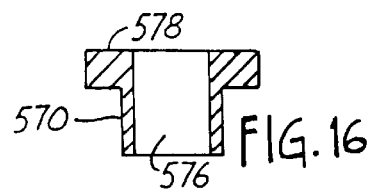
FIG. 16 is a sectional, side view of an embodiment of a brushing cap for use in the aerosol delivery apparatus of FIG. 9, where the cross section is taken through the center of the brushing cap.
Figure 17:
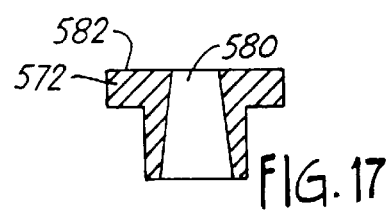
FIG. 17 is a sectional, side view of an alternative embodiment of a brushing cap for use in the aerosol delivery apparatus of FIG. 9, where the cross section is taken through the center of the brushing cap.
Figure 18:
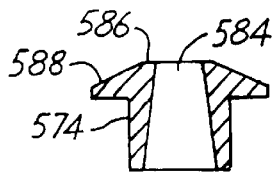
FIG. 18 is a sectional, side view of a second alternative embodiment of a brushing cap for use in the aerosol delivery apparatus of FIG. 9, where the cross section is taken through the center of the brushing cap.

The flow of reactants into main chamber 372 can be affected by the placement of a cap bushing at the opening of port 540. More specifically, a cap bushing can help provide a more confined reactant stream within main chamber 372. Three embodiments of cap bushings 570, 572, 574 are shown in FIGS. 16–18, respectively. Referring to FIG. 16, cap bushing 570 has a cylindrical passage 576 and a flat upper surface 578 generally perpendicular to the central axis of cylindrical passage 576. Referring to FIG. 17, cap bushing 572 has a conical passage 580 and a flat upper surface 582 generally perpendicular to the symmetry axis of conical passage 580. Referring to FIG. 18, cap bushing 574 has a conical passage 584 and a top surface with a flat section 586 and a conical section 588. Preferred embodiments of cap bushings have a sharp edge between the internal passage and the top surface.

The reaction chamber and reactant supply system preferably are constructed from stainless steel or other corrosion resistant metal. O-rings and other seals can be made from natural or synthetic rubber or other polymers.

Figure 19:
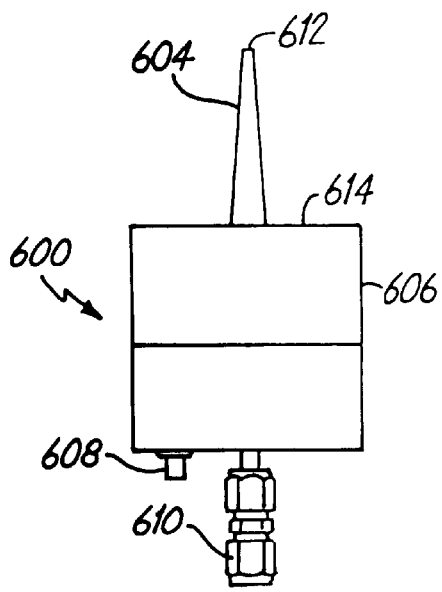
FIG. 19 is a side view of an ultrasonic aerosol generator having an atomization surface.
Figure 20:
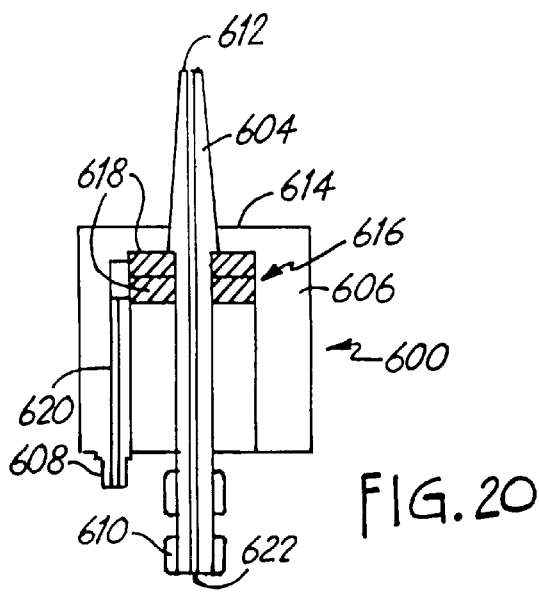
FIG. 20 is a sectional, side view of the ultrasonic aerosol generator of FIG. 19, where the cross section is taken through the center of the apparatus.
Figure 21:
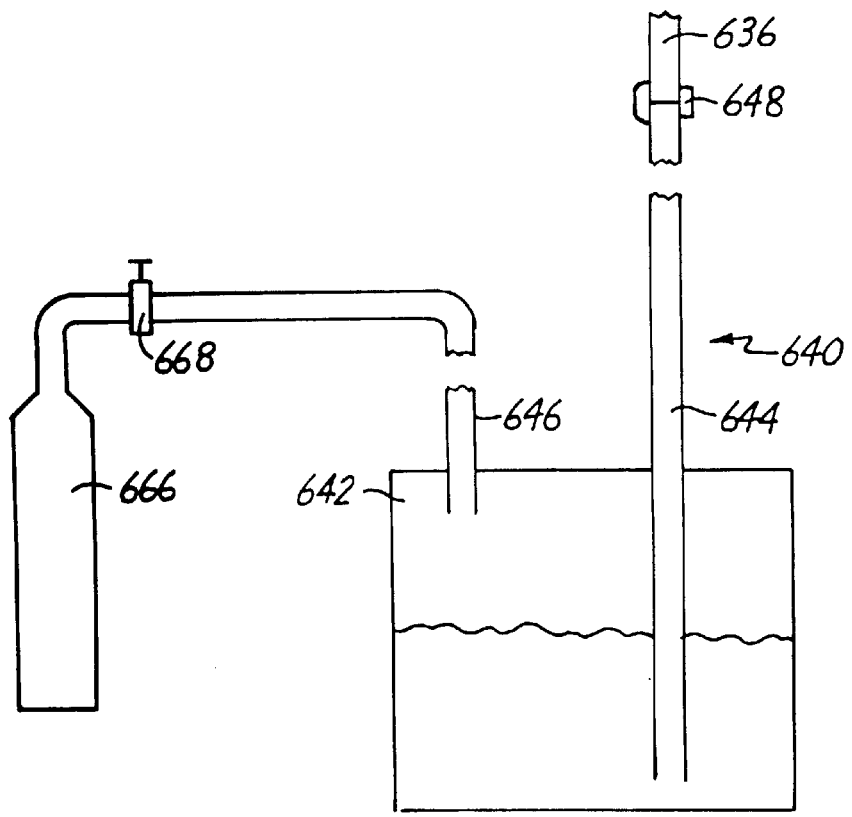
FIG. 21 is a schematic, side view of a liquid supply system for supplying liquid to the aerosol generator of FIGS. 19 and 20.

Referring to FIG. 10, in a preferred embodiment, aerosol generator 482 included an ultrasonic nozzle 600 and nozzle supply 602. Preferred ultrasonic nozzle 600 is a model 8700–120 from Sono-Tek Corporation, Milton, N.Y. Referring to FIGS. 19–20, ultrasonic nozzle 600 includes a nozzle tip 604, a nozzle body 606, a connector 608 for connection to an ultrasonic generator, and a liquid connection 610 for connection to a liquid reservoir. The end of nozzle tip 604 is an atomization surface 612. The size and shape of atomization surface 612 can be varied to yield a desirable spacial distribution of aerosol particles.

Nozzle tip 604 is connected to nozzle body 606 at or near top surface 614. Ultrasonic transducer 616 is located within nozzle body 606 at a suitable position to vibrate nozzle tip 604. Generally, ultrasonic transducer 616 is located toward top surface 614. Preferred ultrasonic transducers include, for example, piezoelectric transducers. Preferably, ultrasonic transducer 616 includes two or more piezoelectric transducers 618 coupled to oscillate in phase such that the amplitudes of the two vibrating piezoelectric transducers add to create an additive force at atomizing surface 612.

Ultrasonic transducer 616 is connected to an ultrasonic generator by way of connector 608. The ultrasonic generator preferably is a broad band generator operating over a frequency range from about 20 kHz to about 120 kHz. The electrical signal from the ultrasonic generator is conveyed from connector 608 to ultrasonic transducer 616 by way of conductors 620.

Liquid flows from liquid connection 610 to atomization surface 612 through channel 622, which runs through nozzle body 606. Referring to FIG. 10, nozzle supply 628 is connected to liquid connection 610 with a liquid fitting 630. Nozzle supply 628 includes a needle valve with pneumatic control. Nozzle supply 628 has a pneumatic control inlet 632, a needle valve adjustment 634 and a liquid feedstock inlet 636. Pneumatic control inlet and liquid feedstock inlet are accessed through central channel 508, which extends through base plate 488.

Liquid feedstock inlet 636 is connected to a liquid supply apparatus 640, shown schematically in FIG. 21. Liquid supply apparatus 640 includes, at least, one liquid source 642, an outlet tube 644 and a gas supply tube 646. Tube 644 connects with fitting 648 to liquid feedstock inlet 636. Similarly, tube 644 is connected directly or indirectly to liquid source 642. Liquid source 642 also connects to gas supply tube 646. Gas supply tube connects to a gas source 666, which can be a gas cylinder or the like. Flow from gas source 666 to gas supply tube 664 is controlled by one or more valves 668. Gas under pressure from gas supply tube 664 forces liquid from liquid source 642 into tube 644.

Proper placement of liquid source 642 can result in gravity supplying the pressure as an alternative to using gas pressure. In other embodiments, mechanical pumps are used to supply a relatively constant amount of pressure within tube 644. Suitable pumps include, for example, a plurality of syringe or piston pumps that operate sequentially.

In use, the aerosol generator 482 produces an aerosol of a liquid supplied to aerosol generator 482. Aerosol generator 482 can deliver a gas along with the aerosol. Also, the aerosol can be combined with a gas supplied through tube 536. Thus, the aerosol and any gases supplied from aerosol generator 482 and/or tube 536 are directed into reaction chamber 352 near port 540 of cap 486. The aerosol and any gases emanating from aerosol generator 482 and/or tube 536 can be combined further within reaction chamber 352 with additional gases from projecting tubes 546. The resulting mixture of aerosol and gases is subsequently reacted within reaction chamber 352.

For the performance of laser pyrolysis based reaction synthesis, the aerosol/gas mixture generally includes one or more reactants in aerosol form, optionally, one or more additional reactant gases, a laser absorbing gas if the reactants do not sufficiently absorb the laser radiation, and, optionally, an inert gas. The gases can be supplied from a pressurized cylinder or other suitable container. Multiple reactants can be mixed in the liquid phase and delivered as the aerosol.

Alternative aerosol generators can be used with the elongated reaction chamber. In addition, one or more aerosol generators can be configured with the elongated reaction chamber in a variety of ways. These alternatives are described in commonly assigned and simultaneously filed U.S. patent application Ser. No. 09/188,670 to Gardner et al. now U.S. Pat. No. 6,139,936, entitled "Reactant Delivery Apparatuses," incorporated herein by reference.

3. Heat Treatment

As noted above, properties of the product particles can be modified by further processing. In particular, manganese oxide nanoscale particles can be heated in an oven in an oxidizing environment or an inert environment to alter the oxygen content, to change the crystal lattice, or to remove adsorbed compounds on the particles to improve the quality of the particles.

The use of sufficiently mild conditions, i.e., temperatures well below the melting point of the particles, results in modification of the manganese oxide particles without significantly sintering the particles into larger particles. The processing of metal oxide nanoscale particles in an oven is discussed further in copending and commonly assigned, U.S. patent application Ser. No. 08/897,903, filed Jul. 21, 1997, now U.S. Pat. No. 5,889,514 entitled "Processing of Vanadium Oxide Particles With Heat," incorporated herein by reference.

A variety of apparatuses can be used to perform the heat processing. An example of an apparatus 700 to perform this processing is displayed in FIG. 22. Apparatus 700 includes a tube 702 into which the particles are placed. Tube 702 is connected to a reactant gas source 704 and inert gas source 706. Reactant gas, inert gas or a combination thereof are placed within tube 702 to produce the desired atmosphere.

Preferably, the desired gases are flowed through tube 702. Appropriate reactant gases to produce an oxidizing environment include, for example, $O_2$, $O_3$, CO, $CO_2$ and combinations thereof. The reactant gas can be diluted with inert gases such as Ar, He and $N_2$. The gases in tube 702 can be exclusively inert gases if an inert atmosphere is desired. The reactant gases may not result in changes to the stoichiometry of the particles being heated.

Tube 702 is located within oven or furnace 708. Oven 708 maintains the relevant portions of the tube at a relatively constant temperature, although the temperature can be varied systematically through the processing step, if desired. Temperature in oven 708 generally is measured with a thermocouple 710. The manganese oxide particles can be placed in tube 702 within a vial 712. Vial 712 prevents loss of the particles due to gas flow. Vial 712 generally is oriented with the open end directed toward the direction of the source of the gas flow.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the particles can be performed in oven 708 at somewhat higher temperatures to produce slightly larger, average particle diameters.

For the processing of manganese oxide, for example, the temperatures preferably range from about 50° C. to about 600° C. and more preferably from about 50° C. to about 550° C. The particles preferably are heated for about 5 minutes to about 100 hours. Some empirical adjustment may be required to produce the conditions appropriate for yielding a desired material.

B. Particle Properties

A collection of particles of interest generally has an average diameter for the primary particles of less than about 500 nm, preferably from about 5 nm to about 100 nm, more preferably from about 5 nm to about 50 nm. The primary particles usually have a roughly spherical gross appearance. Upon closer examination, the manganese oxide particles generally have facets corresponding to the underlying crystal lattice. Nevertheless, the crystalline primary particles tend to exhibit growth that is roughly equal in the three physical dimensions to give a gross spherical appearance. In preferred embodiments, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. Nevertheless, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, $TiO_2$ nanoparticles generally exhibit altered absorption properties based on their small size, as described in copending and commonly assigned U.S. patent application Ser. No. 08/962,515 now U.S. Pat. No. 6,699,798, entitled "Ultraviolet Light Block and Photocatalytic Materials," incorporated herein by reference.

Laser pyrolysis as described above generally results in particles having a very narrow range of particle diameters. With aerosol delivery, the distribution of particle diameters is particularly sensitive to the reaction conditions. Nevertheless, if the reaction conditions are properly controlled, a very narrow distribution of particle diameters can be obtained with an aerosol delivery system as described above. The primary particles preferably have a high degree of uniformity in size. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent of the primary particles have a diameter greater than about 60 percent of the average diameter and less than about 140 percent of the average diameter.

Furthermore, in preferred embodiments no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the nanoparticles generally have a very high purity level. The crystalline manganese oxide nanoparticles produced by the above described methods are expected to have a purity greater than the reactant gases because the crystal formation process tends to exclude contaminants from the lattice. Furthermore, crystalline manganese oxide particles produced by laser pyrolysis have a high degree of crystallinity. Impurities on the surface of the particles may be removed by heating the particles to achieve not only high crystalline purity but high purity overall.

Manganese oxides are known to exist in a wide range of oxidation states from +2 to +4. The most common stoichiometries for manganese oxides include MnO, $Mn_3O_4$, $Mn_2O_3$, $Mn_5O_8$, and $MnO_2$. MnO and $Mn_5O_8$ have only a single known crystalline phase. In particular, MnO has a cubic crystal structure while $Mn_5O_8$ has a monoclinic crystal structure. Several of the manganese oxides can exist in alternative crystal structures. For example, $Mn_3O_4$ has either a tetragonal or orthorhombic crystal structure. $Mn_2O_3$ has either a cubic or a hexagonal crystal structure. Also, $MnO_2$ has either a cubic, orthorhombic or tetragonal crystal structure.

EXAMPLES

Example 1

Gas Phase Reactants

The synthesis of magnesium oxide particles described in this example was performed by laser pyrolysis. The particles were produced using essentially the laser pyrolysis apparatus of FIG. 2, described above, using the reactant delivery apparatus of FIG. 3 along with the solid precursor delivery system shown schematically in FIG. 1.

The manganese carbonyl (Strem Chemical, Inc., Newburyport, Mass.) precursor vapor was carried into the reaction chamber by flowing Ar gas through the solid precursor delivery system containing the $Mn_2(CO)_{10}$. The precursor was heated to a temperature as indicated in Table 1. $C_2H_4$ gas was used as a laser absorbing gas, and Argon was used as an inert gas. The reaction gas mixture containing $Mn_2(CO)_{10}$, Ar, $O_2$ and $C_2H_4$ was introduced into the reactant gas nozzle for injection into the reaction chamber. The reactant gas nozzle had an opening with dimensions of ⅝ in.×1/16 in. Additional parameters of the laser pyrolysis synthesis relating to the particles of Example 1 are specified in Table 1.

TABLE 1

|  | 1 | 2 | 3 |
|---|---|---|---|
| Crystalline Phase | Manganosite | Manganosite | Manganosite & unidentified |
| Crystal Structure | Cubic | Cubic | Cubic |
| Pressure (Torr) | 180 | 320 | 430 |
| Argon F.R.-Window (SCCM) | 700 | 700 | 700 |
| Argon F.R.-Shielding (SLM) | 1.71 | 1.99 | 1.99 |
| Ethylene (SCCM) | 492 | 517 | 517 |
| Carrier Gas (Argon) SCCM | 507 | 507 | 627 |
| Oxygen (SCCM) | 348 | 400 | 420 |
| Laser Output (Watts) | 260 | 108 | 206 |
| Precursor Temperature ° C. | 140 | 140 | 150 | sccm = standard cubic centimeters per minute
slm = standard liters per minute
Argon - Win. = argon flow through inlets 216, 218
Argon - Sld. = argon flow through annular channel 142.

Figure 23:
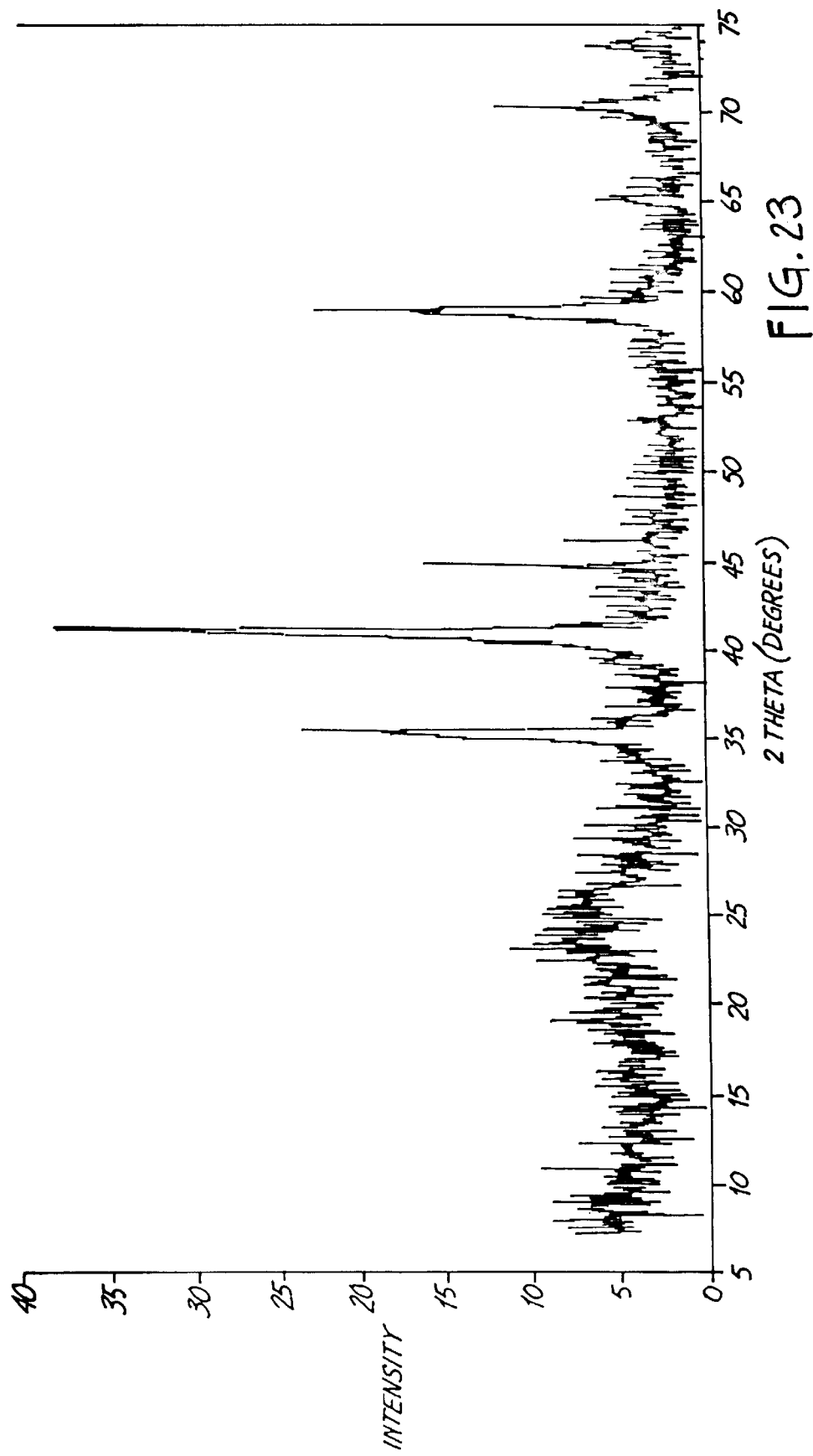
FIG. 23 is an x-ray diffractogram of manganese oxide nanoparticles produced by laser pyrolysis with gaseous reactants according to the parameters specified in column 1 of Table 1.
Figure 24:
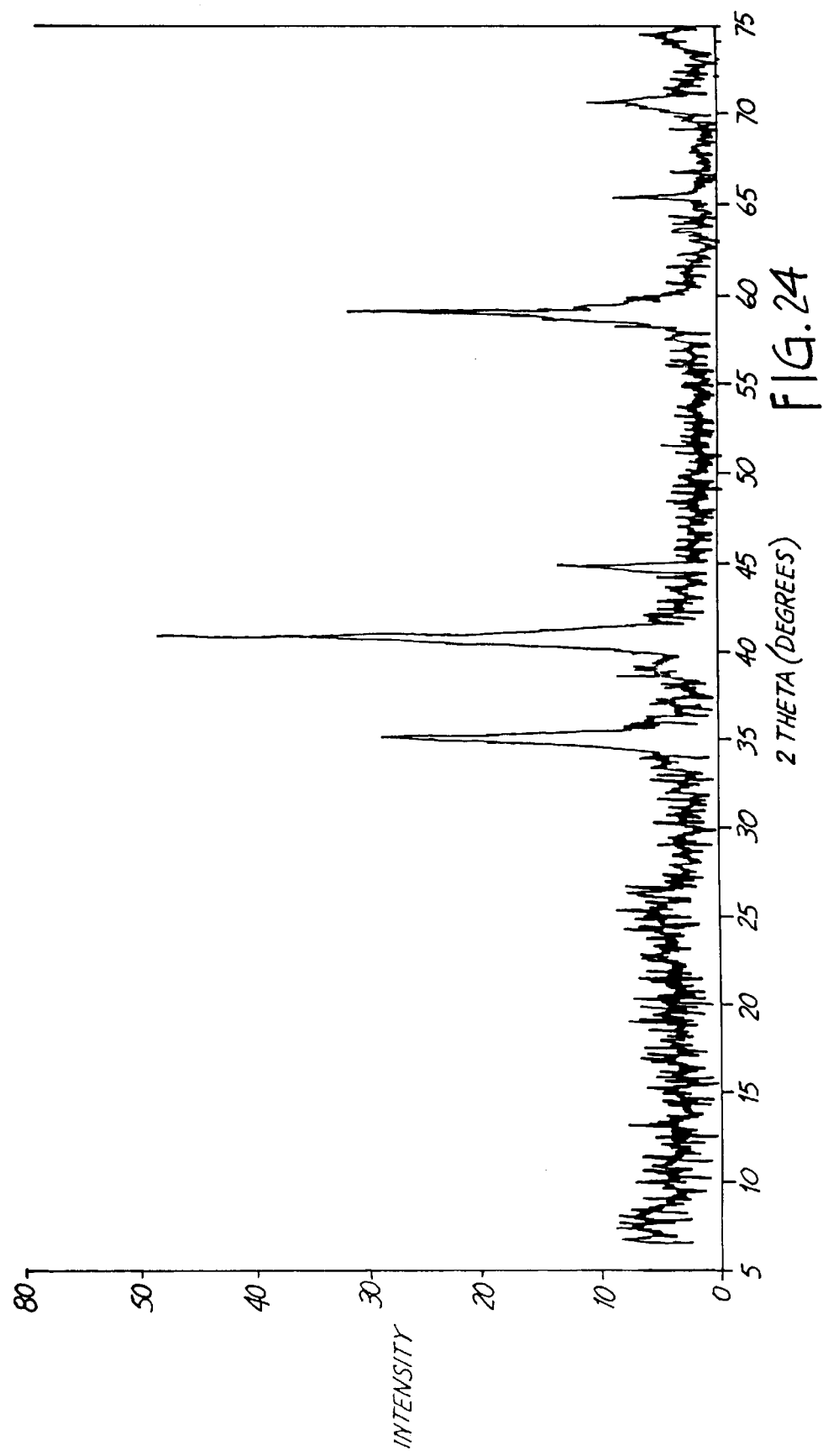
FIG. 24 is an x-ray diffractogram of manganese oxide nanoparticles produced by laser pyrolysis with gaseous reactants according to the parameters specified in column 2 of Table 1.
Figure 25:
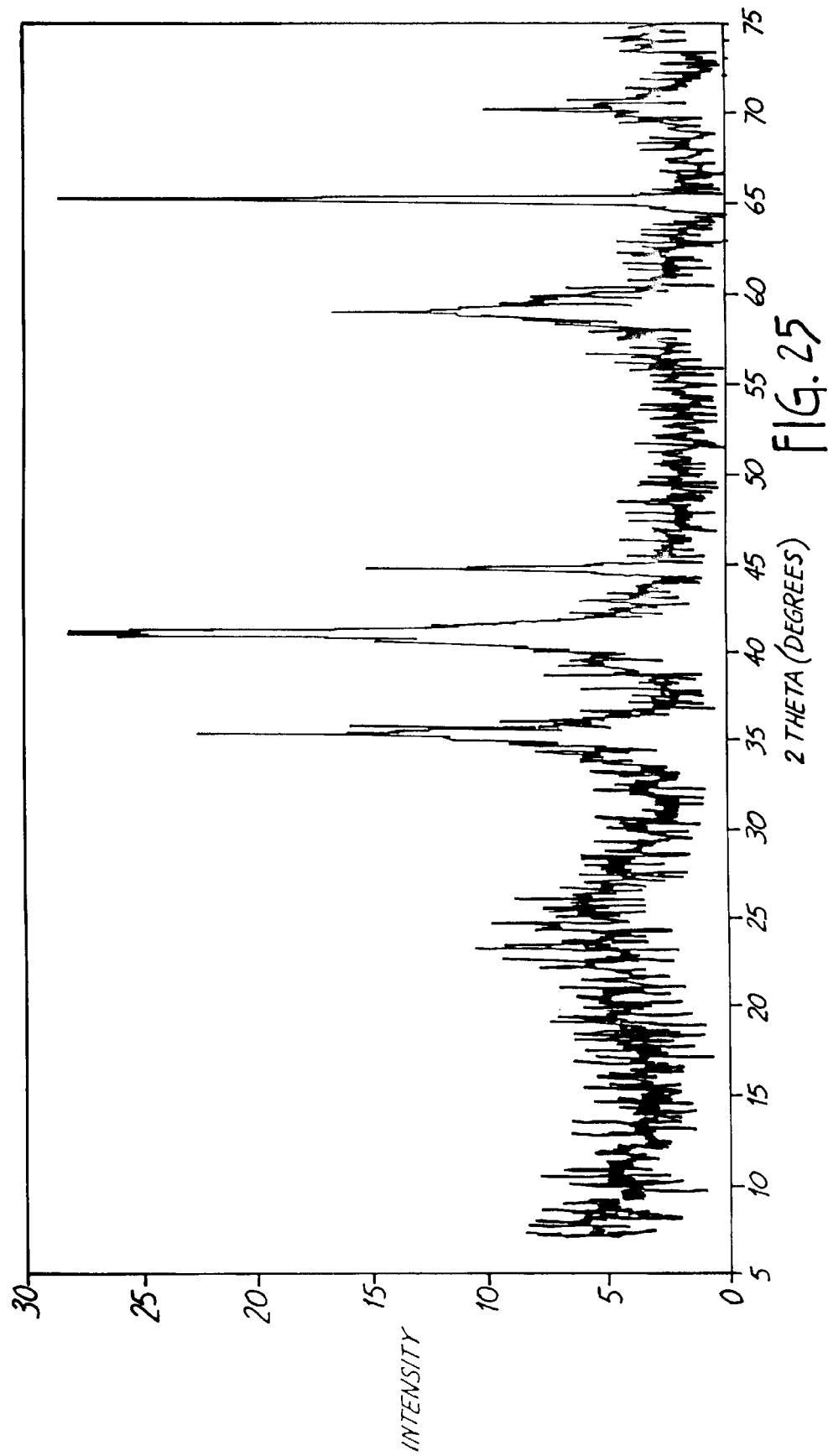
FIG. 25 is an x-ray diffractogram of manganese oxide nanoparticles produced by laser pyrolysis with gaseous reactants according to the parameters specified in column 3 of Table 1.

The production rate of manganese oxide particles was typically about 1 g/hr. To evaluate the atomic arrangement, the samples were examined by x-ray diffraction using the Cu(Ka) radiation line on a Siemens D500 x-ray diffractometer. X-ray diffractograms for a sample produced under the conditions specified in the three columns of Table 1 is shown in FIGS. 23–25, respectively. Under the set of conditions specified in Table 1, the particles had an x-ray diffractogram corresponding to manganosite (cubic) MnO. The particles produced under the conditions in the third column of Table 1 also had a peak at 65° produced by the aluminum samples holder. The sample holder is occasionally seen in the diffractogram. The diffractograms may also have peaks indicating the presence of small amounts of amorphous carbon, which can form as a coating on the particles. The amorphous carbon can be removed by gentle heating in an oxygen environment. Such coating of amorphous carbon are described further in copending and commonly assigned U.S. patent application Ser. No. 09/136,483 to Kumar et al., entitled "Aluminum Oxide Particles," incorporated herein by reference.

Figure 26:
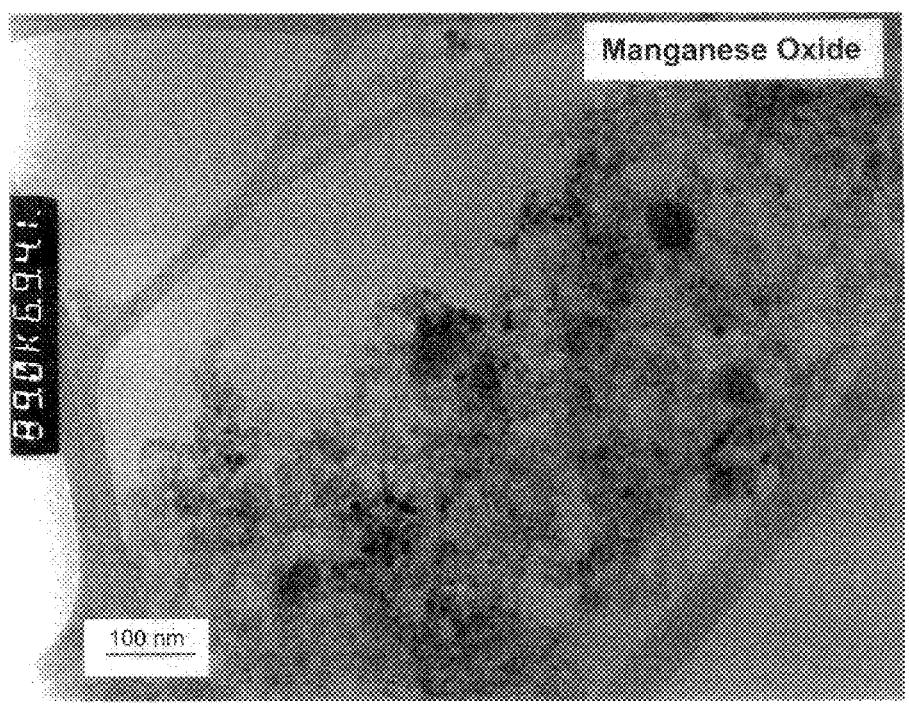
FIG. 26 is a transmission electron micrograph of manganese oxide nanoparticles produced by laser pyrolysis with gaseous reactants according to the parameters specified in column 2 of Table 1.
Figure 27:
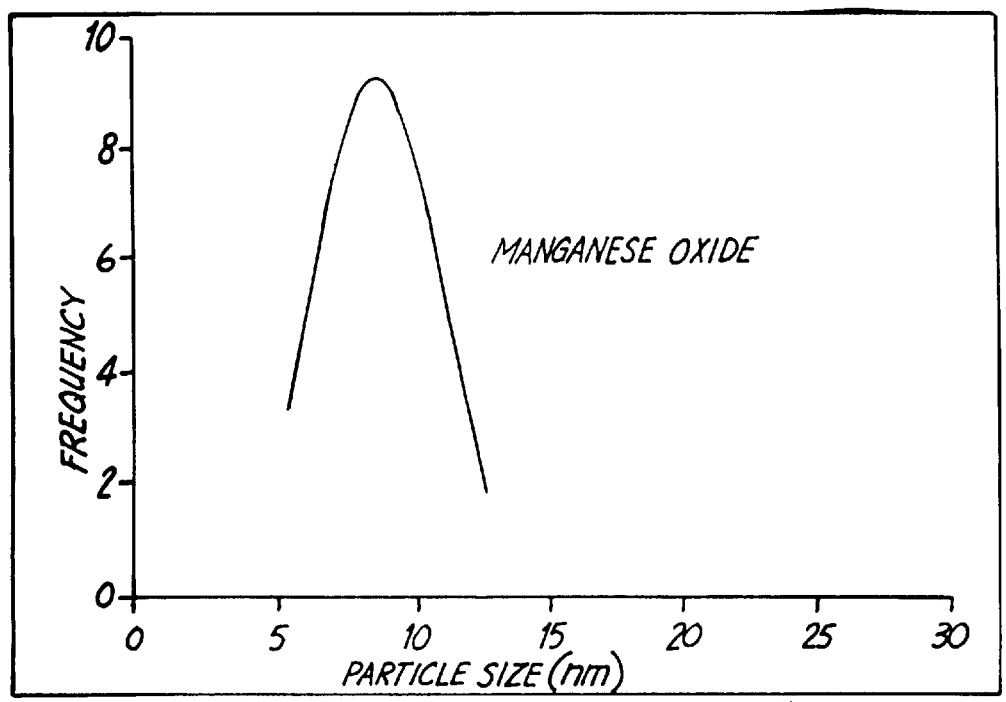
FIG. 27 is a plot of particle diameter distribution for the particles shown in the transmission electron micrograph shown in FIG. 26.

Transmission electron microscopy (TEM) was used to determine particle sizes and morphology. A TEM photograph of the particles produced under the conditions in the second column of Table 1 are shown in FIG. 26. An examination of a portion of the TEM micrograph yielded an average particle size of about 9 nm. The corresponding particle size distribution is shown in FIG. 27. The approximate size distribution was determined by manually measuring diameters of the particles distinctly visible in the micrograph of FIG. 26. Only those particles having clear particle boundaries were measured to avoid regions distorted or out of focus in the micrograph. Measurements so obtained should be more accurate and are not biased since a single view cannot show a clear view of all particles. It is significant that the particles span a rather narrow range of sizes.

Example 2

Aerosol Metal Precursors, First Laser Pyrolysis Apparatus

The synthesis of magnesium oxide particles described in this example was performed by laser pyrolysis. The particles were produced using essentially the laser pyrolysis apparatus of FIG. 2, described above, using the reactant delivery apparatus of FIG. 4.

The manganese chloride (Alfa Aesar, Inc., Ward Hill, Mass.) precursor vapor was carried into the reaction chamber as an aerosol of an aqueous solution formed with deionized water. $C_2H_4$ gas was used as a laser absorbing gas, and Argon was used as an inert gas. The reactant mixture containing $MnCl_2$, Ar, $O_2$ and $C_2H_4$ was introduced into the reactant nozzle for injection into the reaction chamber. The reactant nozzle had an opening with dimensions of ⅝ in.×1/16 in. Additional parameters of the laser pyrolysis synthesis relating to the particles of Example 2 are specified in Table 2.

TABLE 2

|  | 1 |
|---|---|
| Crystalline Phase | Amorphous + Manganosite (MnO) |
| Crystal Structure | Cubic |
| Pressure (Torr) | 350 |
| Argon F.R.-Window (SCCM) | 700 |
| Argon F.R.-Shielding (SLM) | 6.8 |
| Ethylene (SLM) | 1.27 |
| Carrier Gas (Argon) SLM | 6.35 |
| Oxygen (SCCM) | 883 |
| Laser Output (Watts) | 660 |
| Precursor | Manganese Chloride solution in water |
| Precursor Molarity | 2 M |
| Precursor Temperature ° C. | Room Temperature | sccm = standard cubic centimeters per minute
slm = standard liters per minute
Argon - Win. = argon flow through inlets 216, 218
Argon - Sld. = argon flow through annular channel 142.

The production rate of manganese oxide particles was typically about 1 g/hr. To evaluate the atomic arrangement, the samples were examined by x-ray diffraction using the Cu(Ka) radiation line on a Siemens D500 x-ray diffractometer. X-ray diffractograms for a sample produced under the conditions specified in Table 2 is shown in FIG. 28. The particles again had an x-ray diffractogram corresponding to manganosite (cubic) MnO, although the peaks in the x-ray diffractogram were very weak indicating that the particles were substantially amorphous. Based on these results, variations in the reaction conditions should result in either amorphous MnO or more highly crystalline MnO.

Figure 30:
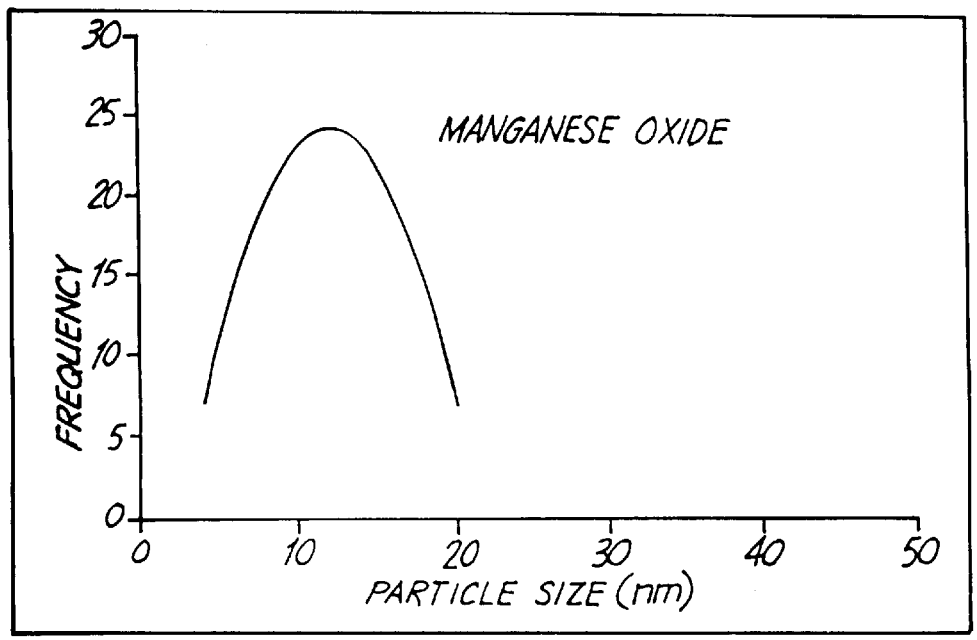
FIG. 30 is a plot of particle size distribution for the particles shown in the transmission electron micrograph shown in FIG. 29.
Figure 29:
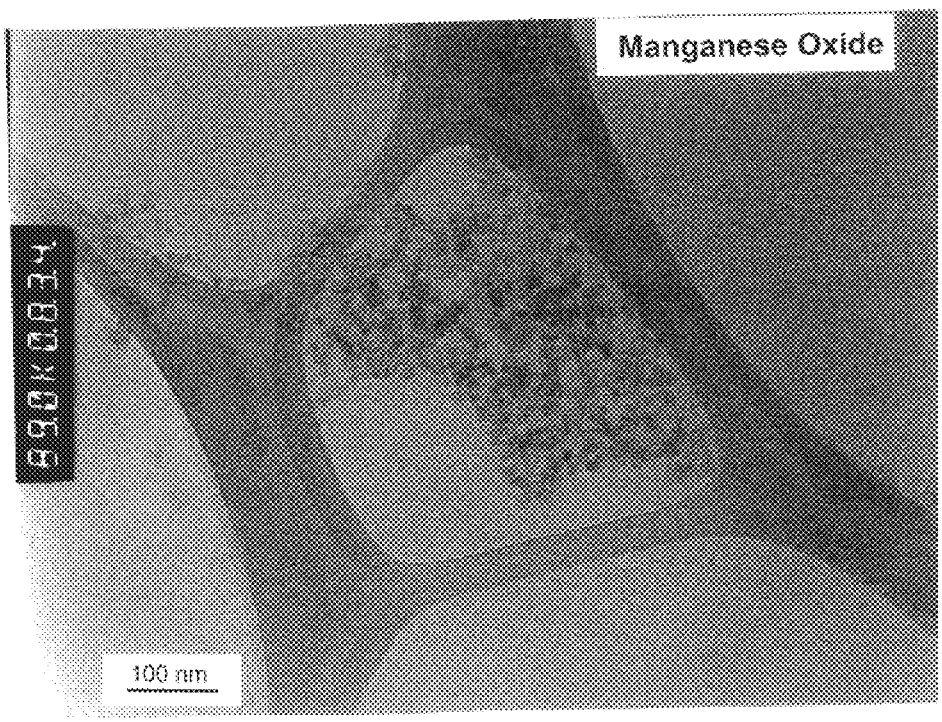
FIG. 29 is a transmission electron micrograph of manganese oxide nanoparticles produced by laser pyrolysis with an aerosol manganese precursor according to the parameters specified in Table 2.

Transmission electron microscopy (TEM) was used to determine particle sizes and morphology. A TEM micrograph for the particles produced under the conditions of Table 2 is displayed in FIG. 29. The corresponding particle size distribution is shown in FIG. 30. The particle size distribution was obtained following the procedure described in Example 1.

Example 3

Heat Treated Samples

Samples of manganese oxide nanoparticles produced by laser pyrolysis according to the conditions specified in the second column of Table 1 and in Table 2 were heated in an oven under oxidizing conditions. Three samples were heat treated. Two separate samples were heat processed starting with the nanoparticles produced under the conditions in Table 2. The oven was essentially as described above with respect to FIG. 5. Between about 100 and about 300 mg of nanoparticles were placed in an open 1 cc vial within the quartz tube projecting through the oven. Oxygen gas was flowed through a 1.0 in diameter quartz tube. Other parameters of the heat processing are specified in Table 3.

TABLE 3

| | Temperature | Time | Oxygen Flow Rate | Crystalline Phase |
|---|---|---|---|---|
| Sample 1 | 480° C. | 3 hrs | 200 cc/min | $Mn_5O_8$ |
| Sample 2A | 480 | 5 hrs | 300 cc/min | $Mn_3O_4$, $Mn_2O_3$ |
| Sample 2B | 300 | 20 hrs | 350 cc/min | $Mn_3O_4$ |

Sample 1 - Sample prepared from particles produced according to the parameters in the second column of Table 1.
Samples 2A & 2B - Samples prepared from particles produced according to the parameters of Table 2.

Figure 33:
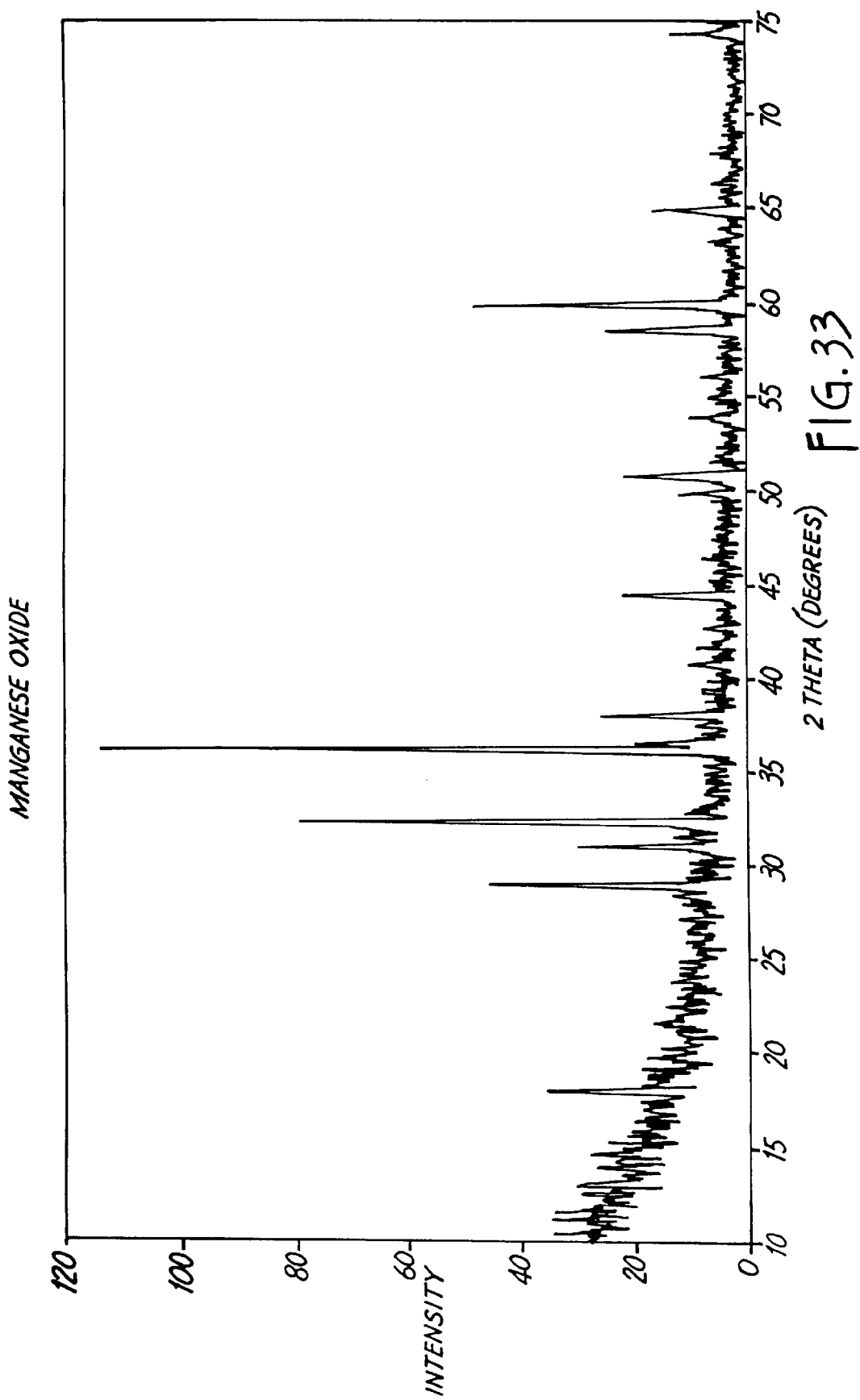
FIG. 33 is an x-ray diffractogram of manganese oxide nanoparticles following a heat treatment of particles produced by laser pyrolysis, sample 2B of Table 3.

The crystal structure of the resulting heat treated particles were determined by x-ray diffraction. The x-ray diffractogram for samples 1, 2A and 2B of Table 3 are shown in FIGS. 31–33, respectively. The x-ray diffractogram shown in FIG. 31 indicates that the manganese oxide in Sample 1 was converted to a form with a stoichiometry of $Mn_5O_8$. The x-ray diffractogram of Sample 2A shown in FIG. 32 indicates the presence of $Mn_3O_4$ with additional peaks in the spectrum at 23° and 33° corresponding to a minor amount of $Mn_2O_3$. The x-ray diffractogram of Sample 2B in FIG. 30 indicates that the manganese oxide was converted to $Mn_3O_4$. It is not clear why the MnO samples upon heat treatment resulted in different stoichiometries of manganese oxide. The different results may be due to the different properties of the starting materials or the different amounts of heating times.

Example 4

Aerosol Metal Precursors, Second Laser Pyrolysis Apparatus

The synthesis of magnesium oxide particles described in this example was performed by laser pyrolysis. The particles were produced using a laser pyrolysis apparatus essentially as shown in FIGS. 6–13, described above and the ultrasonic nozzle essentially as shown in FIGS. 19–20. No cap bushing was used, and the ultrasonic transducer had a simple conical horn tip. A spacer 550 and shim 558 was used to raise the level of the ultrasonic nozzle to approximately the top of the cap. The solution delivered by the aerosol delivery apparatus contained 111.6 gm (19.4 weight percent) $MnNO_3 \cdot H_2O$ (Alfa Aesar, Inc., Ward Hill, Mass.), 386 gm (67.2 weight percent) isopropyl alcohol, 75 gm (13 weight percent) water and 2.3 gm (0.4 weight percent) HCl. Isopropyl alcohol acts as an infrared absorber. The liquid flow rate was greater than about 10 ml/min. Oxygen was mixed with the aerosol by delivery through tube 536 and port 540. Projecting tubes 546 in FIG. 10 were not present. The top of cap 486 was about 0.85 inches from the center line of the laser beam. Additional parameters for two runs are presented in Table 4.

TABLE 4

| | 1 | 2 |
|---|---|---|
| Crystalline Phase | MnO + $Mn_3O_4$ | MnO + $Mn_3O_4$ |
| Pressure (Torr) | 300 | 200 |
| Argon Window (SLM) | 10 | 7.5 |
| Argon Shielding (SLM) | 40 | 70 |
| Oxygen (SLM) | 5 | 5 |

TABLE 4-continued

| | 1 | 2 |
|---|---|---|
| Laser Power (input) (watts) | 1500 | 1800 |
| Laser Power (output) (watts) | 1300 | 1300 |
| Absorbed Laser Power (watts) | 200 | 500 |
| Mass of Powder Recovered | 3.4 | 5.0 |
| Run Duration (min.) | about 30 | <30 |
| Ultrasonic Transducer Power (Watts) | 2.3 | 4.6 | sccm = standard cubic centimeters per minute
slm = standard liters per minute
Argon - Win. = argon flow through inlets 330, 332
Argon - Sld. = argon flow through shielding gas conduits 365.
Laser Power (input) = Laser power input into reaction chamber.
Laser Power (output) = Laser power exiting the reaction chamber into the beam dump.

The conditions specified in column 1 of Table 4 resulted in brown powder while the parameters specified in the second column of Table 4 resulted in yellow powder.

Figure 34:
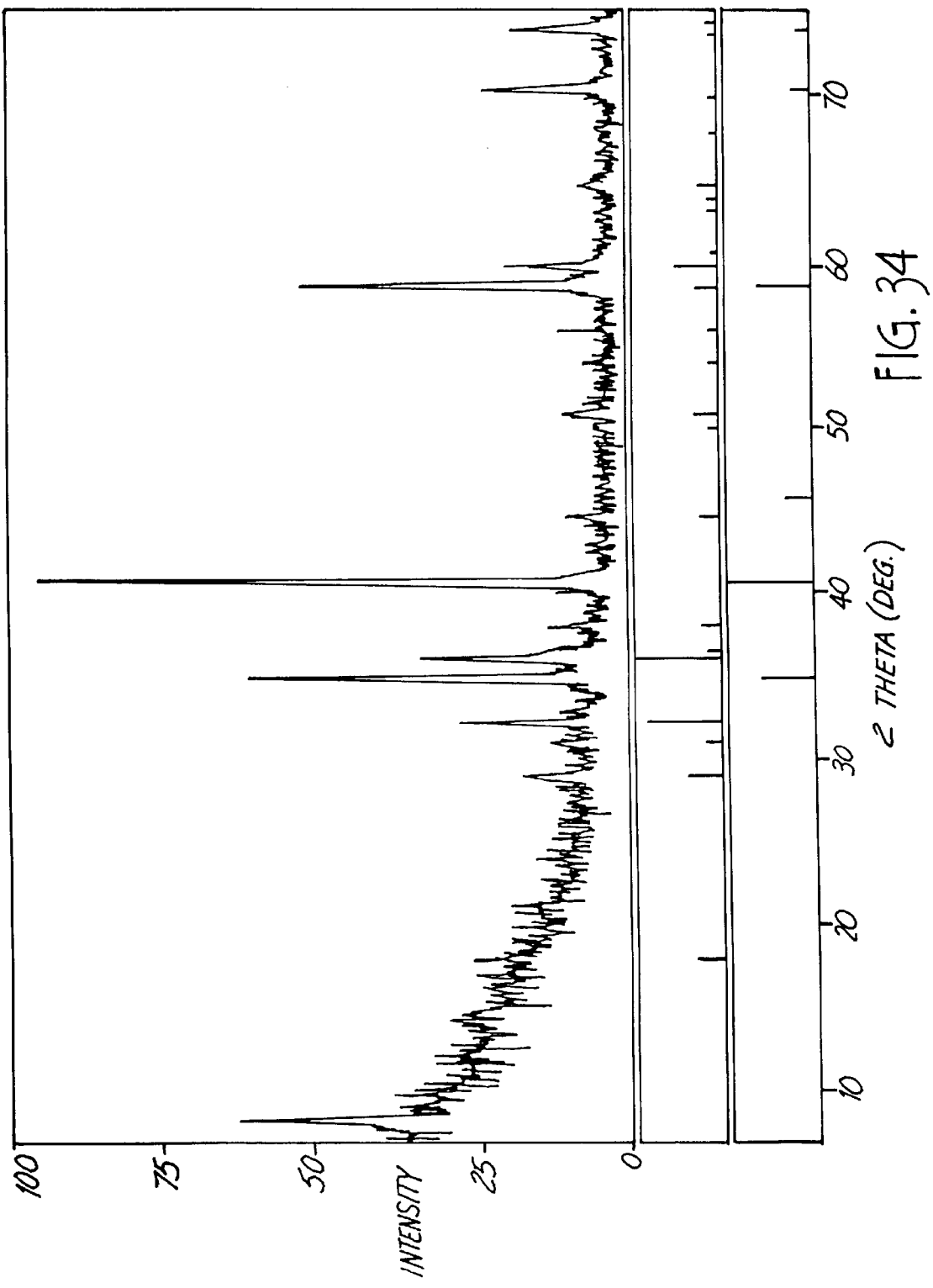
FIG. 34 is an x-ray diffractogram of manganese oxide nanoparticles produced by laser pyrolysis using with aerosol reactants according to the parameters specified in column 1 of Table 4.
Figure 35:
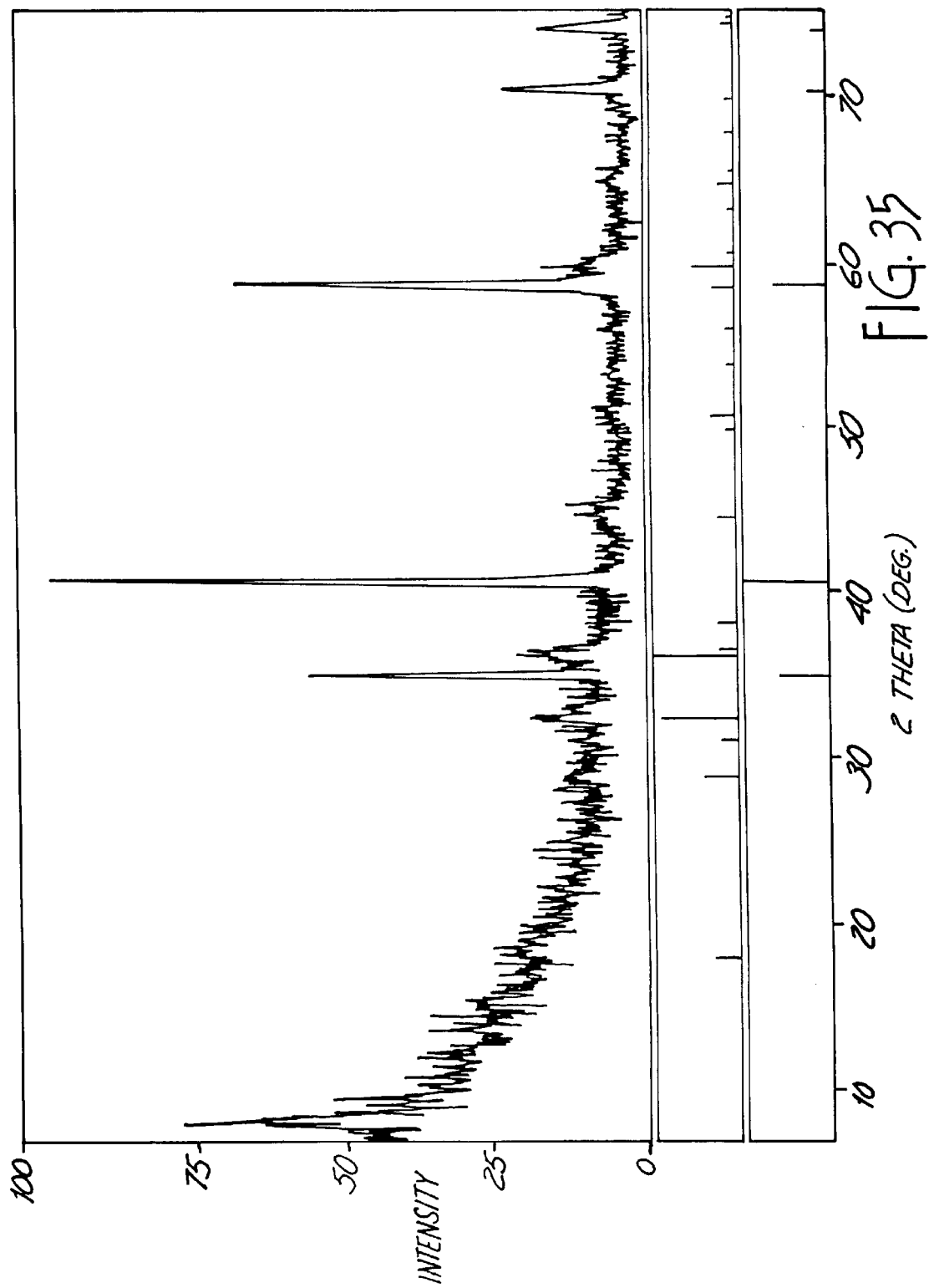
FIG. 35 is an x-ray diffractogram of manganese oxide nanoparticles produced by laser pyrolysis using with aerosol reactants according to the parameters specified in column 2 of Table 4.

To evaluate the atomic arrangement, the samples were examined by x-ray diffraction using the Cu(Ka) radiation line on a Siemens D500 x-ray diffractometer. X-ray diffractograms for a sample produced under the conditions specified in column 1 and column 2 of Table 4 are shown in FIGS. 34 and 35, respectively. The particles produced under the conditions in columns 1 and 2 of Table 4 had x-ray diffractograms indicating the presence of both manganosite (cubic) MnO and hausmannite $Mn_3O_4$. The conditions in column 1 evidently resulted in a higher proportion of $Mn_3O_4$ relative to MnO. The composition difference may be correlated with a more violent reaction observed under the conditions specified in column 2.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A collection of particles comprising manganese oxide, the collection of particles having an average diameter less than about 250 nm, the manganese oxide having a structure selected from the group consisting of crystalline MnO, crystalline $MnO_2$, crystalline $Mn_5O_8$ and crystalline $Mn_2O_3$, wherein the collection of particles form a powder.

2. The collection of particles of claim 1 wherein the collection of particles have an average diameter from about 5 nm to about 250 nm.

3. The collection of particles of claim 1 wherein the collection of particles have an average diameter from about 5 nm to about 100 nm.

4. The collection of particles of claim 1 wherein the collection of particles have an average diameter from about 5 nm to about 50 nm.

5. The collection of particle of claim 1 wherein the particles comprise crystalline MnO.

6. The collection of particles of claim 1 wherein the particles comprise crystalline $Mn_2O_3$.

7. The collection of particles of claim 1 wherein the particles comprise crystalline $Mn_5O^8$.

8. The collection of particles of claim 1 wherein effectively no particles have a diameter greater than about four times the average diameter of the collection of particles.

9. The collection of particles of claim 1 wherein the collection of particles have a distribution of particle sizes such that at least about 95 percent of the particles have a diameter greater than about 40 percent of the average diameter and less than about 160 percent of the average diameter.

10. The collection of particles of claim 1 wherein effectively no particles have a diameter greater than about three times the average diameter of the collection of particles.

11. The collection of particles of claim 1 wherein effectively no particles have a diameter greater than about two times the average diameter of the collection of particles.

12. The collection of particles of claim 1 wherein the collection of particles have a distribution of particle sizes such that at least about 95 percent of the particles have a diameter greater than about 60 percent of the average diameter and less than about 140 percent of the average diameter.

13. A battery having a cathode comprising manganese oxide particles, said manganese oxide particles having an average diameter less tan about 250 nm wherein the particles form a powder contained within the electrode structure.

14. The battery of claim 13 wherein the manganese oxide particles have an average diameter from about 5 nm to about 100 nm.

15. The battery of claim 13 wherein the manganese oxide particles have an average diameter from about 5 nm to about 50 nm.

16. The battery of claim 13 wherein effectively no manganese oxide particles have a diameter greater than about four times the average diameter of the collection of particles.

17. The battery of claim 13 wherein the manganese oxide particles comprise manganese oxide selected from the group consisting of crystalline MnO, crystalline $Mn_5O_8$, crystalline $MnO_2$ and crystalline $Mn_2O_3$.

18. A collection of particles comprising maganese oxide, the collection of particles having an average diameter less than about 500 nm, wherein the collection of particles have a distribution of particle sizes such that at least about 95 percent of the particles have a diameter greater than about 40 percent of the average diameter and less than bout 160 percent of the average diameter, wherein the collection of particles form a powder.

19. The collection of particles of claim 18 wherein effectively no particles have a diameter greater than about four times the average diameter of the collection of particles.

20. The collection of particles of claim 18 wherein the collection of particles have a distribution of particle sizes such that at least about 95 percent of the particles have a diameter greater than about 60 percent of the average diameter and less than about 140 percent of the average diameter.

21. The collection of particles of claim 18 wherein the manganese oxide comprises a crystalline structure.

22. The collection of particles of claim 18 wherein the manganese oxide comprises an amorphous structure.

23. The collection of particles of claim 18 wherein the manganese oxide comprises $MnO_2$.

24. The collection of particles of claim 18 wherein the manganese oxide comprises a composition selected from the group consisting of MnO, $Mn_5O_8$, $Mn_3O_4$, and $Mn_2O_3$.

25. The collection of parties of claim 18 having an average diameter less than about 100 nm.

26. A collection of particles comprising manganese oxide, the collection of particles having an average diameter less than about 500 nm wherein effectively no particles have a diameter greater than about four times the average diameter of the collection of particles and wherein the collection of particles form a powder.

27. The collection of particles of claim 26 wherein the manganese oxide comprises a crystalline structure.

28. The collection of particles of claim 26 wherein the manganese oxide comprises an amorphous structure.

29. The collection of particles of claim 26 wherein the manganese oxide comprises $MnO_2$.

30. The collection of particles of claim 26 wherein the manganese oxide comprises a composition selected from the group consisting of MnO, $Mn_5O_8$, $Mn_3O_4$, $Mn_2O_3$.

31. The collection of particles of clam 26 having an average diameter less than about 100 nm.

* * * * *